United States Patent
Kumar et al.

(10) Patent No.: US 10,503,788 B1
(45) Date of Patent: Dec. 10, 2019

(54) MAGNETIC SCORE ENGINE FOR A CO-LOCATION FACILITY

(71) Applicant: Equinix, Inc., Redwood City, CA (US)

(72) Inventors: Parveen Kumar, Fremont, CA (US); Mohan Navaratna, San Jose, CA (US); Jaganathan Jeyapaul, San Jose, CA (US); Brian J. Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 659 days.

(21) Appl. No.: 15/179,645

(22) Filed: Jun. 10, 2016

Related U.S. Application Data

(60) Provisional application No. 62/277,676, filed on Jan. 12, 2016, provisional application No. 62/319,611, filed on Apr. 7, 2016.

(51) Int. Cl.
| | |
|---|---|
| *H04L 29/08* | (2006.01) |
| *G06F 16/951* | (2019.01) |
| *G06Q 30/02* | (2012.01) |
| *G06F 3/0481* | (2013.01) |

(52) U.S. Cl.
CPC .......... *G06F 16/951* (2019.01); *G06F 3/0481* (2013.01); *G06Q 30/0201* (2013.01); *H04L 67/1097* (2013.01)

(58) Field of Classification Search
CPC ....................................................... H04L 67/16
USPC ............................................................ 718/1
See application file for complete search history.

(56) References Cited

U.S. PATENT DOCUMENTS

| | | | | |
|---|---|---|---|---|
| 7,684,321 | B2 * | 3/2010 | Muirhead | H04L 12/4641 370/230 |
| 8,069,079 | B1 * | 11/2011 | Teal | G06Q 10/06 705/7.36 |
| 8,423,672 | B2 * | 4/2013 | Liu | H04L 29/12066 709/245 |
| 8,495,199 | B2 * | 7/2013 | Miller | H04L 41/5051 370/254 |

(Continued)

OTHER PUBLICATIONS

"Are Your Digital Assets Mission-Critical?," Feb. 2014, www.equinix.com, 4 pp.

(Continued)

*Primary Examiner* — Cheyne D Ly
(74) *Attorney, Agent, or Firm* — Shumaker & Sieffert, P.A.

(57) ABSTRACT

In some examples, a method includes querying, by a magnetic score engine executing at a computing device, first telemetry data indicating one or more interconnections established between a first co-location facility customer and at least one additional co-location facility customer within at least one co-location facility operated by a co-location facility provider. The method further includes generating, by the magnetic score engine and based at least in part on the first telemetry data, a magnetic score for the first co-location facility customer, the magnetic score indicating an importance of the first co-location facility customer to the least one additional co-location facility customer being co-located at the at least one co-location facility. The method further includes outputting, by the magnetic score engine and for display at a display device, the magnetic score for the first co-location facility customer.

19 Claims, 8 Drawing Sheets

(56) References Cited

U.S. PATENT DOCUMENTS

| | | | |
|---|---|---|---|
| 8,537,845 B2* | 9/2013 | Waldrop | G06Q 30/0611 370/395.53 |
| 8,615,419 B2 | 12/2013 | Eilam et al. | |
| 8,630,892 B2 | 1/2014 | Bhalla et al. | |
| 8,639,549 B2* | 1/2014 | Pathak | G06Q 10/063 705/7.12 |
| 8,712,828 B2 | 4/2014 | Maga et al. | |
| 9,065,872 B1* | 6/2015 | Duarte | H04L 65/403 |
| 9,576,048 B2* | 2/2017 | Akolkar | G06F 17/30707 |
| 10,158,727 B1* | 12/2018 | Mukhopadhyaya | H04L 67/16 |
| 2003/0200135 A1 | 10/2003 | Wright | |
| 2006/0143027 A1 | 6/2006 | Jaganathan et al. | |
| 2007/0185867 A1 | 8/2007 | Maga et al. | |
| 2008/0208654 A1 | 8/2008 | Nahikian et al. | |
| 2009/0106064 A1 | 4/2009 | Egner et al. | |
| 2010/0125473 A1* | 5/2010 | Tung | G06F 9/5072 709/200 |
| 2011/0086611 A1 | 4/2011 | Klein et al. | |
| 2011/0106579 A1 | 5/2011 | Nair et al. | |
| 2011/0137805 A1* | 6/2011 | Brookbanks | G06F 9/5072 705/80 |
| 2011/0178831 A1 | 7/2011 | Ravichandran | |
| 2011/0270968 A1* | 11/2011 | Salsburg | G06F 9/5072 709/224 |
| 2012/0053990 A1 | 3/2012 | Pereg et al. | |
| 2012/0095841 A1 | 4/2012 | Luckerman et al. | |
| 2013/0003538 A1 | 1/2013 | Greenberg et al. | |
| 2013/0211873 A1 | 8/2013 | Varadarajan et al. | |
| 2013/0279672 A1 | 10/2013 | Mohan et al. | |
| 2013/0282897 A1* | 10/2013 | Siegel | H04L 43/0876 709/224 |
| 2015/0172193 A1 | 6/2015 | Sinha et al. | |
| 2015/0371163 A1 | 12/2015 | Noh et al. | |
| 2016/0080275 A1 | 3/2016 | Kumaresh et al. | |
| 2016/0203509 A1 | 7/2016 | Sharp, III et al. | |
| 2017/0012831 A1* | 1/2017 | Felbinger | H04L 41/145 |
| 2017/0061343 A1 | 3/2017 | Han et al. | |
| 2017/0061344 A1 | 3/2017 | Han et al. | |

OTHER PUBLICATIONS

"Equinix Customer Success Story: Marketo," Marketing Services, Oct. 13, 2014, www.equinix.com, 4 pp.

"How do you maximize the value of your digital assets?," Interconnection, accessed on Oct. 13, 2015, www.equinix.com, 4 pp.

"Interconnection 101," 451 Research, Aug. 2015, 40 pp.

Lawyer, "Understanding the influence of all nodes in a network: a continuous-time perspective," Scientific Reports, Mar. 2, 2015, 9 pp.

Lawyer, "Understanding the spreading power of all nodes in a network: a continuous-time perspective," Jun. 12, 2014, PNAS, 16 pp.

Mihalcea et al., "TextRank: Bringing Order into Texts," Jul. 2004, UNT Scholarly Works, 8 pp.

U.S. Appl. No. 15/011,104, by Mohan Navaratna, filed Jan. 29, 2016.

U.S. Appl. No. 15/001,766, by Ravindra JN Rao, filed Jan. 20, 2016.

U.S. Appl. No. 15/099,407, filed by Juxiang Teng, filed Apr. 14, 2016.

Response to Non-Final Office Action filed in U.S. Appl. No. 15/011,104 dated Mar. 14, 2019, 16 pp.

Office Action from U.S. Appl. No. 15/011,104, dated Dec. 14, 2018, 19 pp.

Office Action from U.S. Appl. No. 15/011,104, dated Jul. 10, 2019, 26 pp.

Amendment in Response to Office Action dated Jul. 10, 2019, from U.S. Appl. No. 15/011,104, filed Sep. 10, 2019, 16 pp.

Advisory Action dated Oct. 10, 2019, from U.S. Appl. No. 15/011,104, 2 pp.

\* cited by examiner

MAGNETIC SCORE ENGINE FOR A CO-LOCATION FACILITY

PRIORITY CLAIM

This application claims the benefit of U.S. Provisional Application No. 62/277,676 filed Jan. 12, 2016 and U.S. Provisional Application No. 62/319,611 filed Apr. 7, 2016, the entire content of each of which are incorporated herein by reference.

TECHNICAL FIELD

The invention relates to data centers and, more specifically, to a co-location facility for interconnecting customers of the co-location facility provider.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such co-location facilities may be shared by the multiple customers. By using co-location facilities of the provider, customers of the provider including telecommunications providers, Internet Service Providers (ISPs), application service providers, service providers, content providers, and other providers, as well as enterprises, enjoy less latency and the freedom to focus on their core business.

Customers co-located at a co-location facility typically lease space or storage capacity for a set duration. A co-location facility provider's goal may be to reduce vacancy rates in the co-location facility to zero, while maintaining a high level of service. A provider may want to prevent its customers from leaving the co-location facility and encourage other customers to join the co-location facility.

SUMMARY

In general, techniques are described for determining magnetic scores for customers co-located at one or more co-location facilities of a facility provider, where a magnetic score for a given customer indicates an importance of the customer to at least one other customer being co-located at the one or more co-location facilities. An enterprise or service provider may elect to co-locate at a particular co-location facility based at least in part on the presence of a particular customer at the co-location facility. In this way, the customer "attracts" the enterprise or service provider to either co-locate or remain at the co-location facility. A magnetic score engine, described herein, uses customer data and interconnection data to determine a magnetic score for the customer, the magnetic score indicating the strength of attraction of that customer across co-location facilities operated by the co-location facility provider.

The magnetic score determined for a customer may include a weighted composition of at least one sub-score relating to the characteristics of the customer at the co-location facilities. For example, the techniques may include determining magnetic sub-scores for a customer based on the strength of interconnections between the customer and other customers interconnected to the customer via the co-location facilities (interconnection score), the revenue generated by the customer due to interconnections with other customers (revenue score), the planned and/or prediction churn risks of the customer and interconnected customers (churn impact score), the planned and/or predicted growth of the customer and interconnected customers (growth impact score), the geographical distribution of the customer and interconnected customers in various co-location/interconnection facilities (geographical score), and other bases. At least in some examples, sub-scores may be based on telemetry data available to the co-location facility provider and indicating interconnections and, in some cases, a strength thereof between a customer and at least one other customer at the co-location facilities. The magnetic score may therefore define the pull-through strength, or stickiness, of the first customer at the co-location facility.

In some examples, the magnetic score engine determines magnetic scores for customers in a manner that is transitive with respect to customer interconnections at the co-location facilities. For instance, if customer A is interconnected to customer B within a co-location facility, and customer B is interconnected to customer C within the co-location facility, then the magnetic score engine may determine the magnetic score for customer A based on the interconnection between customer B and customer C. In some examples, the magnetic score engine uses one or more ranking and node influence algorithms to support N-degree weighting, bidirectional weighting, and spreading power weighting. The magnetic score engine may apply a combination of a weighted PageRank algorithm, a weighted TextRank algorithm, and a Node Influence algorithm to determine magnetic scores for customer.

A magnetic score determined according to techniques described herein may allow a co-location facility provider to readily determine the importance of a co-location facility customer with respect to other co-location facility customers being co-located at facilities operated by the provider. The co-location facility provider may use a magnetic score to determine pricing strategies for the customer. For example, the provider may offer a customer having a high magnetic score discounted co-location facility resources in view of the attractiveness of that customer to other existing and potential customers of the provider. The co-location facility provider may use the magnetic score to determine the potential revenue impact of the customer leaving the co-location facility. Therefore, in developing a pricing strategy for a customer, a co-location facility provider may seek to understand the impact of a potential customer churn. The co-location facility provider may estimate the potential revenue loss that may be associated with a potential customer churn. Furthermore, the co-location facility provider may adjust the magnetic score engine to focus on various segments of customers.

In some examples, this disclosure describes a method including querying, by a magnetic score engine executing at a computing device, first telemetry data indicating one or more interconnections established between a first co-location facility customer and at least one additional co-location facility customer within at least one co-location facility operated by a co-location facility provider. The method further includes generating, by the magnetic score engine and based at least in part on the first telemetry data, a magnetic score for the first co-location facility customer, the magnetic score indicating an importance of the first co-location facility customer to the least one additional co-location facility customer being co-located at the at least one co-location facility. The method further includes outputting, by the magnetic score engine and for display at a display device, the magnetic score for the first co-location facility customer.

In some examples, this disclosure describes a computing device including one or more processors operably coupled to a memory, and a magnetic score engine configured for execution by the one or more processors to query first telemetry data indicating one or more interconnections established between a first co-location facility customer and at least one additional co-location facility customer within at least one co-location facility operated by a co-location facility provider. The magnetic score engine is further configured for execution to generate, based at least in part on the first telemetry data, a magnetic score for the first co-location facility customer, the magnetic score indicating an importance of the first co-location facility customer to the least one additional co-location facility customer being co-located at the at least one co-location facility. The magnetic score engine is further configured for execution to output, for display at a display device, the magnetic score for the first co-location facility customer.

In some examples, this disclosure describes a non-transitory computer-readable storage medium that is encoded with instructions that, when executed, cause at least one processor of a computing device to query first telemetry data indicating one or more interconnections established between a first co-location facility customer and at least one additional co-location facility customer within at least one co-location facility operated by a co-location facility provider. The non-transitory computer-readable storage medium is further encoded with instructions that, when executed, cause the at least one processor to generate, based at least in part on the first telemetry data, a magnetic score for the first co-location facility customer, the magnetic score indicating an importance of the first co-location facility customer to the least one additional co-location facility customer being co-located at the at least one co-location facility. The non-transitory computer-readable storage medium is further encoded with instructions that, when executed, cause the at least one processor to output, for display at a display device, the magnetic score for the first co-location facility customer.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
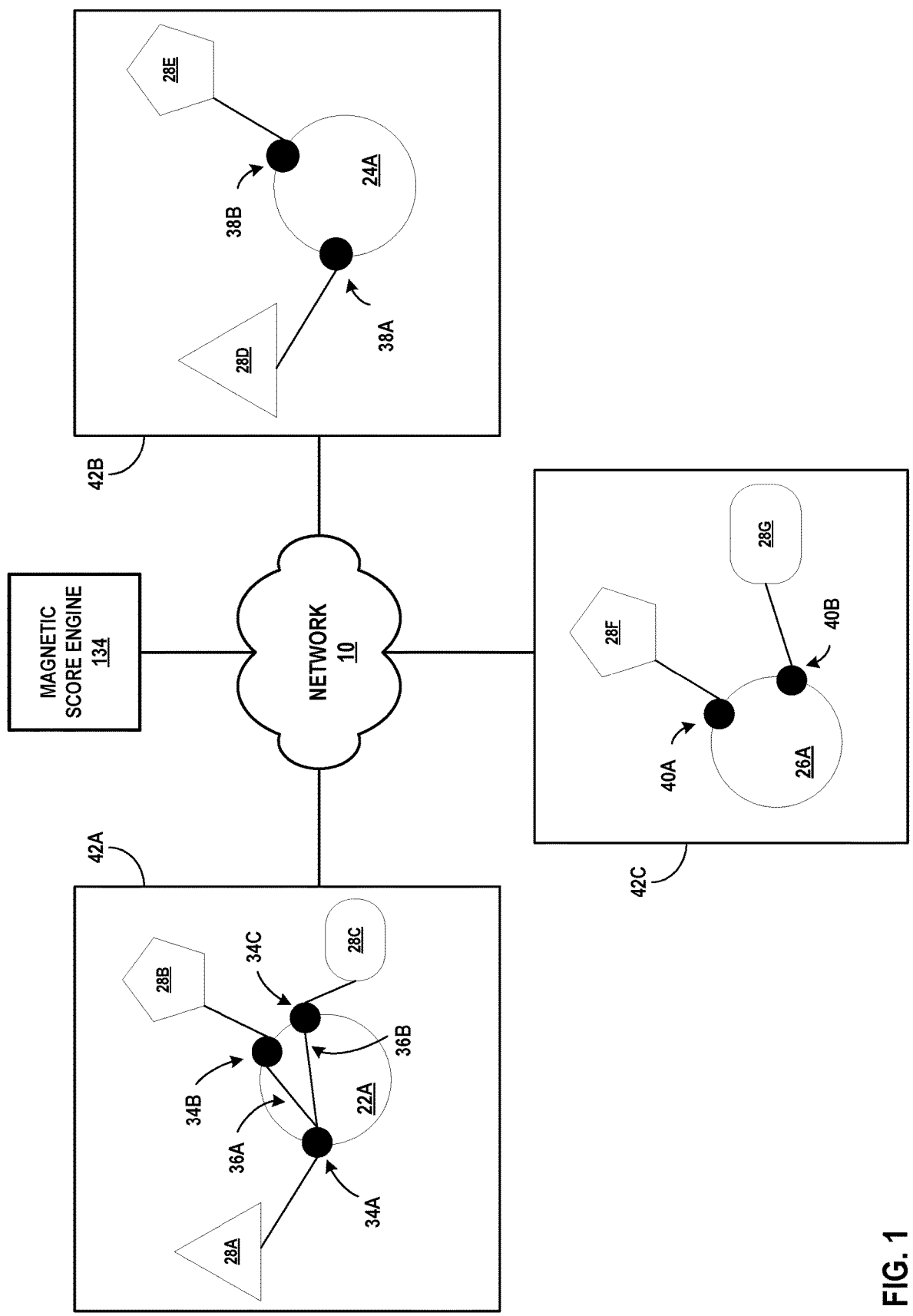
FIG. 1 is a conceptual diagram illustrating the interconnections between one or more co-location facility users at co-location facilities, in accordance with one or more techniques of the disclosure.

A co-location facility may offer a range of cloud computing solutions to co-location facility customers. Cloud computing refers to the use of dynamically scalable computing resources accessible via a network, such as the Internet. Computing resources, often referred to as a "cloud," provide one or more services to users. These services may be categorized according to service types, which may include, for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively. The co-location facility may also be known as a data center, an interconnection facility, or a communication facility.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at co-location facility points that provide for high-speed transmission of information between the customers and service providers.

A co-location facility provider ("provider") employs network infrastructure within a co-location facility that enables customers to connect, using interconnections established within the network infrastructure by the provider, to one another to receive and transmit data for varied purposes. For instance, a co-location facility may provide data transport services for one or more cloud-based services. The co-location facility in this way offers customers connectivity to a vibrant ecosystem of additional customers including content providers, Internet service providers, carriers, and enterprises. Customers of the co-location facility may connect for such end-uses as service delivery, content delivery, financial services, and Internet access, to give just a few examples.

A co-location facility may offer products such as cage, cabinet, and power to its customers. A co-location facility may also offer products relating to interconnection such as cross-connect and virtual circuits. As a result, a co-location facility may be more than just a carrier hotel that provides off-site storage to its customers.

As used herein, the term "customer" of the co-location facility provider or "co-location facility user" may refer to a tenant of at least one co-location facility employed by the co-location facility provider, whereby the customer leases space within the co-location facility in order to colocate with other tenants for improved efficiencies over independent facilities as well as to interconnect network equipment with the other tenants'/customers' network equipment within the co-location facility or campus for reduced latency/jitter and improved reliability, performance, and security versus transport networks, among other reasons. A co-location facility typically hosts numerous customers and their network, server, and/or storage gear. Each customer may have particular reasons for choosing a co-location facility, including capacity, geographical proximity, connecting to other customers, co-locating with other customers, and price.

A co-location facility may provide one or more different types of interconnections between customer networks for customers colocated in the co-location facility. For instance, a co-location facility may provide physical or "layer-1" (in the Open Systems Interconnection model (OSI Model)) interconnections between co-location facility users. Physical interconnections may include physical cross-connects that are established by category 5 or 6 (cat 5/6) cables, coaxial cables, and/or fiber optic cables, for instance. In some examples, a co-location facility may provide data link or "layer-2" (in the OSI Model) interconnections between co-location facility users. In some examples, a co-location facility that provides layer-2 interconnections may be referred to as an Ethernet Exchange, where Ethernet is the underlying layer-2 protocol. In some examples, a co-location facility may provide network and/or transfer or "layer-3/4" (in the OSI Model) interconnections between co-location facility users. In some examples, a co-location facility that providers layer-3/4 interconnections may be referred to an Internet Exchange, where TCP/IP are the underlying layer-3/4 protocols. For example, a co-location facility that provides an Internet Exchange may allow customer routers to directly peer with one another using a layer-3 routing protocol, such as Border Gateway Protocol, to exchange routes for facilitating layer-3 traffic exchange to provide private peering. In some examples, a co-location facility may provide indirect layer-3 routing protocol peering whereby each customer announces its layer-3 routes to an autonomous system (AS) deployed by the co-location facility provider within the co-location facility network infrastructure to provide private peering mediated by the AS. The AS may then relay these routes in conjunction with tunneling or other forwarding information to establish an interconnection between customers. In some examples, a co-location facility that provides indirect layer-3 routing protocol peering to facilitate service traffic exchange in this way may be referred to as a Cloud-based Services Exchange or, more simply, a Cloud Exchange. Additional description of exchanges are found in U.S. application Ser. No. 15/001,766, filed Jan. 20, 2016, entitled "MULTI-CLOUD, MULTI-SERVICE DATA MODEL," the entire content of which is incorporated by reference herein.

In some examples, a "connection" may be a physical or logical coupling between a co-location facility user in a customer or provider network and a co-location facility point. An "interconnection" may be a physical or logical coupling between connections that couple at least two co-location facility users. As such, a network infrastructure configuration within a co-location facility that enables customer networks to connect to exchange data may be referred to herein as an "interconnection." A cross-connect interconnection may refer to a physical coupling between two co-location facility customer networks. An Ethernet interconnection may be a layer 2 coupling between two co-location facility customer networks via ports of the co-location facility. An Internet exchange interconnection may be a layer-3/4 coupling between two co-location facility customer networks via ports of the co-location facility. The foregoing examples of co-location facilities and interconnections are exemplary only and many other types of co-location facilities and interconnections are possible.

Many of the co-location facility customers choose to co-locate at a given facility because of the presence of one or more important customers there. If an important co-location facility customer "churns" by leaving the facility or reducing its services, one or more additional customers co-located at the facility may also churn as a result.

Determining a magnetic score for a first customer involves examining the interconnections of the first customer at a co-location facility. If the first customer is a large cloud customer that is connected with 16 other customers at a co-location facility, it is relevant to know how many interconnections were initiated by the first customer. For the additional customers that initiated interconnections with the first customer, the additional customers may be considered dependent on the first customer. The additional customers may have joined the co-location facility because of the first customer's presence there. It is also relevant whether the additional customers that are interconnected with the first customer joined the co-location facility before or after the first customer joined the co-location facility.

The magnetic score may define the stickiness or pull-through strength of a customer. A high magnetic score may indicate that a particular co-location facility customer is a pillar of the co-location facility ecosystem. The aggregate magnetic scores for all of the customers at a co-location facility may indicate the density of the ecosystem. The magnetic score may measure the network effect, which is also known as the snowball effect. The engine for generating a magnetic score may be flexible and customizable, depending on the considerations of the co-location facility provider. The engine may include machine learning algorithms that adjust the magnetic score model in the engine based on new data indicating customer arrivals, customer churns, and interconnections. Through the machine learning algorithms, the magnetic score engine may evolve on its own, at least in some cases without the need for reprogramming. Magnetic score engine 134 may be a self-learning engine with various combinations of algorithms. Magnetic score engine 134 may continuously learn from available data in order to adapt and adjust to the variations in the data to analyze, evaluate, and calculate the magnetic score without the need to recode or reprogram in some cases. The co-location facility provider may use the magnetic scores to develop pricing strategies and to decide among waitlisted customers when space becomes available at a co-location facility.

In general, this disclosure describes techniques implemented by a magnetic score engine executing at a computing device. The magnetic score engine queries first telemetry data indicating one or more interconnections established between a first co-location facility customer and at least one additional co-location facility customer within at least one co-location facility operated by a co-location facility provider. Customers within the co-location facility may form interconnections to increase the speed of communicating and transferring data among customers. The first telemetry data may include information relating to the intensity and duration of the interconnections between customers.

The magnetic score engine may generate a magnetic score for the first co-location facility customer that indicates the importance of the first co-location facility customer to the least one additional co-location facility customer with respect to the at least one co-location facility. The magnetic score engine may base the magnetic score on the telemetry data by examining the intensity and number of interconnections that involve the first co-location facility customer. The telemetry data may further indicate whether the first co-location facility customer is initiating the interconnections with other customers. As a result, the magnetic score may represent the pull-through strength of the first co-location facility customer. The magnetic scores for customers at a particular co-location facility may indicate the depth and density of the ecosystem at the co-location facility. A high magnetic score represents a deeper and dense ecosystem.

The magnetic score engine may output the magnetic score for the first co-location facility customer to a display device for display. Display devices may include a computer monitor, a tablet, a smartphone, or another device. In some examples, the output may include an explanation of the bases for the magnetic score.

FIG. 1 is a conceptual diagram illustrating interconnections between one or more co-location facility users at co-location facilities, in accordance with one or more techniques of the disclosure. FIG. 1 illustrates multiple geographically distributed co-location facilities 42A, 42B, and 42C. Each of co-location facilities 42A-42C may be separated by a distance of 50 miles or more in some examples. As shown in FIG. 1, co-location facility 42A includes a co-location facility network 22A. Similarly, co-location facility 42B includes a co-location facility network 24A, and co-location facility 42C includes a co-location facility network 26A. In some examples, co-location facilities 42A-42C represent a metro-based interconnection exchange made up of multiple co-location facilities within a single metropolitan area.

In the example of FIG. 1, co-location facility network 22A includes connections 34A-34C by co-location facility users (or "customers") 28A-28C. For instance, co-location facility user 28A may represent a system or network of the user that is coupled to co-location facility network 22A by connection 34A. Similarly, co-location facility user 28B may be a system or network of the user that is coupled to co-location facility network 22A by connection 34B. Co-location facility user 28C may be a system or network of the user that is coupled to co-location facility network 22A by connection 34C. FIG. 1 further illustrates two interconnections 36A and 36B. Interconnection 36A may be a physical or logical coupling between connections 34A and 34B that couple co-location facility user 28A to co-location facility user 28B. Interconnection 36B may be a physical or logical coupling between connections 34A and 34C that couple co-location facility user 28A to co-location facility user 28B.

In some examples, co-location facility user 28A may be important with respect to co-location facility user 28B's decision to join co-location facility 42A. Co-location facility user 28B may place high value on forming interconnections with co-location facility user 28A. Thus, co-location facility user 28B's decision to join or leave co-location facility 42A may depend on the presence of co-location facility user 28A, as well as the strength of the interconnections between users 28A and 28B. Magnetic score engine 134 may recognize the importance of user 28A by assigning a relatively high magnetic score to user 28A.

Magnetic score engine 134 may determine the magnetic score for user 28A by examining the interconnections between users 28A and 28B. Magnetic score engine 134 may also examine the interconnections that user 28B has formed with other users 28. The interconnections of user 28B may provide evidence of the indirect importance of user 28A. If user 28A is very important to the ecosystem of co-location facility 42A, user 28B may also be important to the ecosystem. An important user such as user 28A may have many dependencies, i.e., dependent users that co-locate at a co-location facility 42 due at least in part to the presence of user 28A, and some of these followers, such as user 28B, may have other users 28 dependent upon them. Magnetic score engine 134 may base the magnetic score for user 28A on the interconnections of dependent users, such as user 28B.

As described above, a cross-connect interconnection may refer to a physical coupling (e.g., fiber or Cat5/6 cable between two network devices and/or systems of co-location facility users). An Ethernet interconnection may be a layer-2 coupling between two co-location facility users, such as one or more Virtual Local Area Networks (VLANs) or other logical networks providing L2 reachability. An Internet exchange interconnection may be a layer-3/4 coupling between two co-location facility users, such as a layer-3 network path provided by an Internet Exchange. In some examples, an interconnection may be a virtual circuit established at least in part within a co-location facility. The interconnections described herein may include at least one of a physical cross-connect, a virtual Ethernet connection providing a layer 2 forwarding path, a direct layer 3 peering arrangement to establish an end-to-end layer 3 forwarding path (e.g., using a layer 3 VPN), and an indirect layer 3 peering arrangement to establish an end-to-end layer 3 forwarding path (e.g., using a layer 3 VPN). As used herein, the phrase "at least one of A and B" encompasses A, B, or A and B, regardless of whether A and B represent singular items, categories, or collections. Customers may establish multiple interconnections over a single physical port. For example, a customer may exchange data via a L2 interconnection with a first cloud service provider and via a L3 interconnection with a second cloud service provider, both the L2 and L3 interconnections operating over a single customer port for the customer. In some examples, an enterprise customer may have multiple interconnections, operating over a single port, with multiple different cloud service providers to receive cloud-based services.

In some examples, one or more of interconnections 36 may be based on an order for an interconnection being fulfilled by a programmable network platform and represented in co-location data, interconnection data, and/or telemetry data. For instance, in some examples, magnetic score engine 134 may determine or receive information indicating one or more of interconnections 36 from customer records rather than from a network itself that indicates two customers have a connection. As such, an interconnection entry stored in one or more of co-location data, interconnection data, and/or telemetry data may represent a real or actual interconnection in the form of a cable, configuration, and/or virtual connection.

Magnetic score engine 134 provides a score indicating the pull-through strength for a first co-location facility customer. To generate a magnetic score, magnetic score engine 134 may apply a multi-variable analysis to multi-factor data that includes numerous sub-scores, such as an interconnection sub-score, a revenue sub-score, and a churn impact sub-score, among others. The multi-variable analysis may in some cases apply a combination of machine learning algorithms to co-location data and interconnection data. To generate a magnetic score for user 28A, magnetic score engine 134 may apply a magnetic score model to telemetry data such as cross-connect installations, the strength and duration of interconnections, and interconnection services (e.g., cross-connect and virtual circuit) purchased, among others.

FIG. 1 depicts magnetic score engine 134 as connected to network 10, whereby magnetic score engine 134 may access data describing customer usage of co-location facilities 42. This data may include data describing co-location facility users 28, interconnections 36, connections 34, or co-location facility networks 22, 24, or 26. Magnetic score engine 134 may apply a magnetic score model to co-location data, interconnection data, or telemetry data, for instance, indicating interconnections among customers 28. In some examples, telemetry data may include information about the strength, intensity, and duration of interconnections among customers 28. Magnetic score engine 134 may also query historical interconnection data describing previous interconnections no longer operative within co-location facilities 42 and apply a magnetic score model to the historical interconnection data. Magnetic score engine 134 may output, for display to the co-location facility provider or to another user, the magnetic score generated by the magnetic score engine 134 by application of a magnetic score model.

Figure 2:
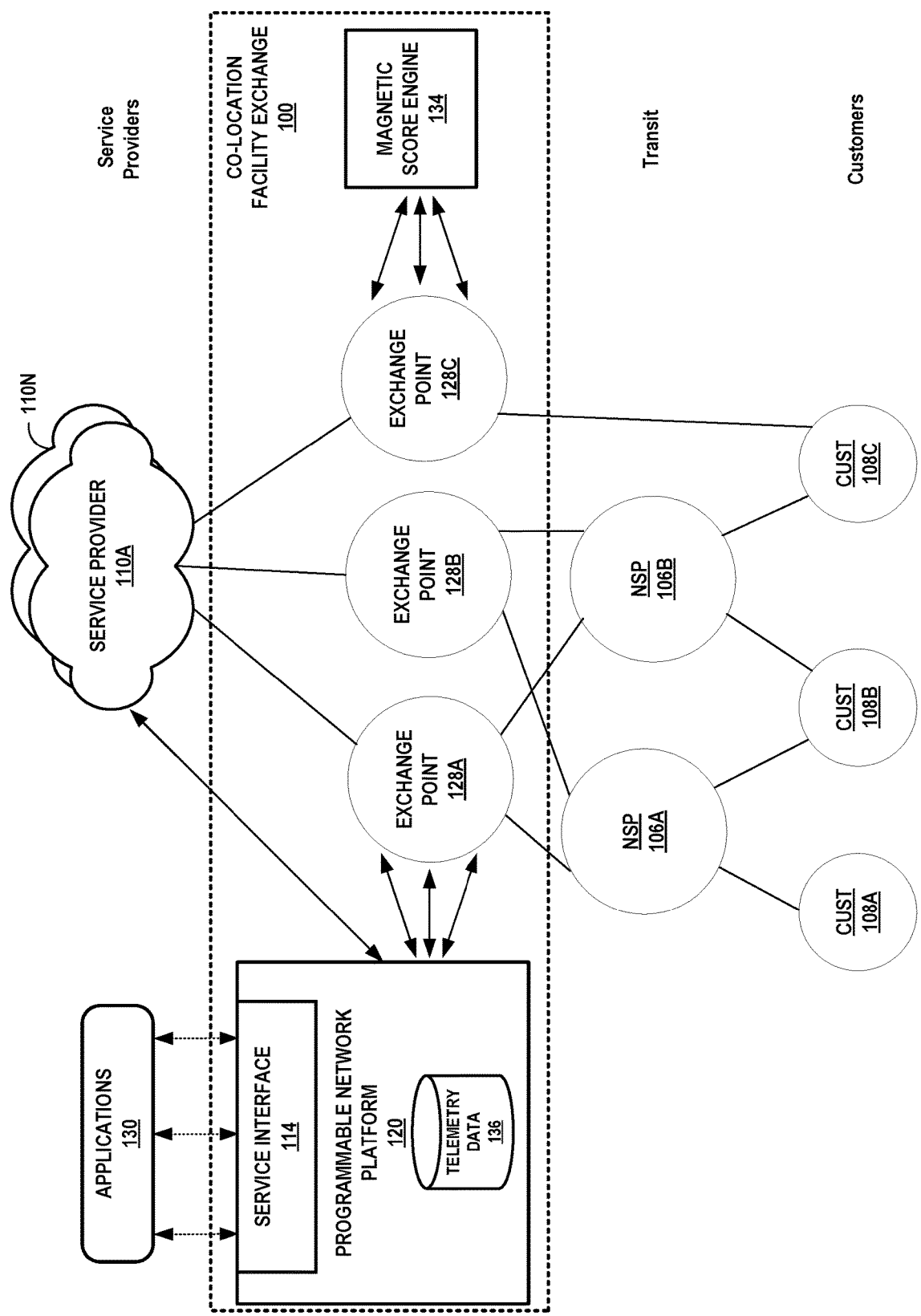
FIG. 2 illustrates a conceptual view of a network system providing metro-based interconnection in which multiple co-location facility points located in a metropolitan area enable interconnection, and a magnetic score engine determines customer importance to co-location facilities according to techniques described herein.

FIG. 2 illustrates a conceptual view of a network system providing metro-based interconnection in which multiple co-location facility points located in a metropolitan area enable interconnection, and a magnetic score engine determines customer importance to co-location facilities according to techniques described herein. FIG. 2 depicts one embodiment of co-location facility exchange 100 and the interconnections between service providers 110 and customers 108. For instance, metro-based co-location facility exchange 100 may enable customers 108A-108C ("customers 108") to bypass the public Internet to directly connect to services providers 110A-110N ("SPs 110" or "service providers 110") so as to improve performance, reduce costs, increase the security and privacy of the connections, and leverage cloud computing for additional applications. The multiple SPs 110 participate in the co-location facility by virtue of their having at least one accessible port in the co-location facility by which a customer can connect to the one or more services offered by the SPs 110, respectively. According to various examples described herein, metro-based co-location facility exchange 100 may allow private networks of any customer to be directly cross-connected to any other customer at a common point, thereby allowing direct exchange of network traffic between the networks of the customers. Customers may include network carriers 106A-106B (collectively, "NSPs 106," or alternatively, "carriers 106"), enterprises, and other users of services offered by one or more service providers.

Each of co-location facility exchange points 128A-128C (illustrated as "exchange points" and described alternatively herein as "co-location facility points" or "exchange points"; collectively referred to as "co-location facility points 128") of metro-based co-location facility exchange 100 (alternatively, "metro 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent co-location facilities by which customers and service providers connect to receive and provide, respectively, services. In other words, co-location facility exchange 100 may include multiple co-location facilities geographically located within a metropolitan area. In some examples, each of the multiple co-location facilities geographically located with a metropolitan area may have low-latency links that connect the multiple co-location facilities in a topology to provide metro-based interconnection services between customers receiving interconnection services at different co-location facilities in the metro-based interconnect facility hub. In various examples, metro-based co-location facility exchange 100 may include more or fewer co-location facility points 128. In some instances, metro-based interconnection exchange 100 may include just one co-location facility exchange point 128. A co-location facility provider may deploy instances of co-location facility exchange 100 in multiple different metropolitan areas, each instance of metro-based co-location facility exchange 100 having one or more co-location facility exchange points 128. As such, a co-location facility exchange point 128 is a co-location facility that includes an exchange by which multiple customers co-located within the co-location facility may interconnect to exchange services and data.

Each of co-location facility exchange points 128 includes network infrastructure and an operating environment by which customers 108 receive services from multiple SPs 110. As noted above, an interconnection may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the metro-based co-location facilities exchange 100, and a cloud exchange in which customer routers peer with metro-based co-location facilities exchange 100 (or "provider") routers rather than directly with other customers.

For interconnections at layer-3 or above, customers 108 may receive services directly via a layer 3 peering and physical connection to one of co-location facility exchange points 128 or indirectly via one of NSPs 106. NSPs 106 provide "transit" by maintaining a physical presence within one or more of co-location facility exchange points 128 and aggregating layer 3 access from one or customers 108. NSPs 106 may peer, at layer 3, directly with one or more co-location facility exchange points 128 and in so doing offer indirect layer 3 connectivity and peering to one or more customers 108 by which customers 108 may obtain services from the metro-based co-location facility hub 100.

In instances in which co-location facility exchange points 128 offer a cloud exchange, each of co-location facility exchange points 128, in the example of FIG. 2, is assigned a different autonomous system number (ASN). For example, co-location facility exchange point 128A is assigned ASN 1, co-location facility exchange point 128B is assigned ASN 2, and so forth. Each co-location facility exchange point 128 is thus a next hop in a path vector routing protocol (e.g., BGP) path from service providers 110 to customers 108. As a result, each co-location facility exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers. In other words, co-location facility exchange points 128 may internalize the eBGP peering relationships that service providers 110 and customers 108 would maintain on a pair-wise basis. Instead, a customer 108 may configure a single eBGP peering relationship with a co-location facility exchange point 128 and receive, via the co-location facility, multiple services from one or more service providers 110. While described herein primarily with respect to eBGP or other layer 3 routing protocol peering between co-location facility points and customer, NSP, or service provider networks, the co-location facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with the co-location facility provider for metro-based co-location facility hub 100 to directly access layer 3 services via co-location facility exchange point 128C and also to have contracted with NSP 106B to access layer 3 services via a transit network of the NSP 106B. Customer 108B is illustrated as having contracted with multiple NSPs 106A, 106B to have redundant access to co-location facility exchange points 128A, 128B via respective transit networks of the NSPs 106A, 106B. The contracts described above are instantiated in network infrastructure of the co-location facility exchange points 128 by L3 peering configurations within switching devices of NSPs 106 and co-location facility exchange points 128 and L3 connections, e.g., layer 3 virtual circuits, established within co-location facility exchange points 128 to interconnect service provider 110 networks to NSPs 106 networks and customer 108 networks, all having at least one port offering connectivity within one or more of the co-location facility exchange points 128.

As shown in FIG. 2, programmable network platform 120 may include telemetry data 136. Telemetry data 136 may include metrics about the quantity, type, strength, intensity, and definition of network and resource configurations that are configured by programmable network platform 120. Telemetry data 136 may include analytics information from infrastructure data collectors based on raw metrics data for resources used in a particular service.

In some examples, telemetry data 136 may include information that indicates connections of co-location facility users to co-location facility points. For instance, a co-location facility user may include a service customer or service provider. In some examples, a connection may be a physical or logical (e.g., L2 or L3) coupling between a co-location facility user in a user network (e.g., customer network or provider network) and a co-location facility point. Telemetry data 126 may include information that indicates interconnections between co-location facility users at a co-location facility point. In some examples, an interconnection may be a physical or logical coupling between at least two co-location facility users in a co-location facility point.

As shown in FIG. 2, magnetic score engine 134 may be included in metro-based co-location facility exchange 100, which depicts a metro-based exchange having multiple exchange points each located in a different co-location facility. In other examples, magnetic score engine 134 may be implemented within programmable network platform 120. In some examples, magnetic score engine 134 may be implemented outside of metro-based co-location facility exchange 100, such as in a different geographic location than metro-based co-location facility exchange 100. Magnetic score engine 134 may be operably coupled to programmable network platform 120, such that magnetic score engine 134 may communicate with programmable network platform 120. As described in this disclosure, magnetic score engine 134 may be implemented in hardware, software, or a combination of hardware and software. For example, magnetic score engine 134 may be executed by one or more real servers in any of the co-location facilities described herein, or by another suitable computation environment.

In accordance with techniques of the disclosure, magnetic score engine 134 may determine a magnetic score for a customer based at least in part on telemetry data for the customer, and output such scoring data to the co-location facility provider. A magnetic score for a first co-location facility customer may indicate that additional co-location facility customers are attracted to the first co-location facility customer. A relatively high magnetic score may further indicate that the first co-location facility customer can pull additional customers into a co-location facility. In addition, the provider may use the magnetic score to develop a strategy to retain the customer. Alternatively, the provider may use the magnetic score to focus retention efforts on a first customer with a relatively high magnetic score.

In operation, to generate scoring data, magnetic score engine 134 may obtain a list of interconnections from programmable network platform 120. Programmable network platform 120 may include service interface 114 that may exchange information with applications 130. Magnetic score engine 134 may identify sets of co-location facilities from the plurality of co-location facilities in which respective co-location facility customers are configured with existing interconnections based at least in part on querying co-location data that indicates co-location facility usage by a first co-location facility customer and telemetry data that indicates interconnections of co-location facility customers within a plurality of co-location facilities administered by a co-location facility provider. For instance, magnetic score engine 134 may determine a co-location facility user identifier that identifies a first co-location facility user. Magnetic score engine 134 may send a request or query to programmable network platform 120 for a set of interconnections that identify the target services to which the first co-location facility user is already interconnected. In some examples, the set of interconnections may specify service identifiers of the target co-location facility users, geographic locations of co-location facilities, and/or identifiers of co-location facilities that include the interconnections, to name only a few examples.

Magnetic score engine 134 may use, as described herein, the data to generate a magnetic score for a first co-location facility user. For instance, magnetic score engine 134 may apply a magnetic score model to the data described herein to generate a magnetic score for the first customer. The application of a magnetic score model may involve machine learning algorithms that can receive and analyze multiple input variables such as the interconnection, revenue, and churn impact sub-scores. Machine learning algorithms may include, but are not necessarily limited to, algorithms such as PageRank, Weighted TextRank, neural networks, random forest, k-means, k-nearest neighbors, linear regression, decision tree, naïve Bayes classifier, support vector machines, and Gaussian processes.

The magnetic score may be a weighted composition of one or more sub-scores. A co-location facility provider may use the magnetic score for many purposes, such as to increase the weight of an interconnection score and a pull-through strength score for a cloud-based service provider, while increasing the weight of a geographical distribution score for an enterprise customer. Each of the sub-scores may be dependent on one or more variables that are weighted according to the type of sub-score. For example, the influence of a second-degree connection may be less than that of a first-degree connection, i.e., the influence or the weight of an nth-degree connection may be less than the influence or weight of an $(n-1)^{th}$-degree connection. Magnetic score engine 134 may apply a combination of weight-based PageRank Algorithm, a weight-based TextRank Algorithm, a weight-based node influence algorithm or any combinations of these algorithms.

In some examples, magnetic score engine 134 may apply machine learning algorithms as part of a magnetic score model that generates a magnetic score. Telemetry data, customer data, market data, and revenue data, among others, may be inputs to magnetic score engine 134. These and other categories of data may be a part of multi-factor data, to which magnetic score engine 134 applies a magnetic score model. Magnetic score engine 134 may output a magnetic score that is a blend or weighted average of numerous sub-scores based on several categories of data. The magnetic score model may include a weighted combination of machine learning algorithms such as PageRank, Weighted TextRank, node influence, co-linear analysis, logistic regression, neural networks, and random forest.

In some examples, magnetic score engine 134 may apply machine learning algorithms to historical data to identify the relative importance of each input variable. Specifically, magnetic score engine 134 may apply machine learning algorithms to historical data to measure how accurately the magnetic score model has measured the pull-through strength in previous iterations. If a previous magnetic score did not accurately predict the importance of a first customer to other customers, magnetic score engine may use machine learning algorithms to adjust the weighting applied to each sub-score. Magnetic sub-scores may include a telemetry sub-score, a network traffic sub-score, a market sub-score, a revenue sub-score, and a spreading power sub-score, among others. Magnetic score engine 134 may use machine learning algorithms to calibrate the magnetic score model by adjusting the weights associated with each input variable and each sub-score.

In some examples, magnetic score engine 134 may apply a least squares method for machine learning. Magnetic score engine 134 may apply the magnetic score model to a set of historical data, and may measure each of the inaccuracies of the magnetic score model's prediction. Using the least squares method, for example, magnetic score engine 134 may quantify and square the magnitude of each inaccuracy. The inaccuracies may indicate the difference between a magnetic score prediction for a first customer and a measured importance of the first customer at a later date. Magnetic score engine 134 may then apply one or more additional magnetic score models and may square the magnitude of each inaccuracy for each magnetic score model. In this example, using the least squares method, magnetic score engine 134 may then select the magnetic score model, from two or more magnetic score models, with the lowest sum of squares.

Magnetic score engine 134 may have one or more input variables to which magnetic score engine 134 applies a magnetic score model. By identifying the relative importance of each input variable, magnetic score engine 134 may assign weights to each input variable or each sub-score. For example, if magnetic score engine 134 examines the historical data and identifies interconnection trend as a relatively important input variable and market segment as a relatively unimportant input variable, magnetic score engine 134 may assign a relatively high weight to interconnection trend and a relatively low weight to market segment. Magnetic score engine 134 may use a machine learning algorithm such as least squares to calibrate the weights of each input variable to minimize errors. There are many other machine learning algorithms that magnetic score engine 134 may use, besides least squares, such as PageRank, Weighted TextRank, node influence, neural networks, random forest, Bayesian algorithms, k-means, support vector algorithms, and so forth.

In one example, magnetic score engine 134 may assign specific weights to each input variable or each sub-score. The specific weights that magnetic score engine assigns may correspond to the importance or influence of each input variable. Through the use of machine learning algorithms in some examples, magnetic score engine 134 may adjust the specific weights for one or more input variables based on recent data. The receipt of data relating to users that recently joined or departed may prompt magnetic score engine 134 to adjust the specific weights for one or more input variables. Example input variables include information from telemetry data 136 and co-location data. Telemetry data 136 may include interconnection data, cross-connect installations, and interconnection services (e.g., cross-connect and virtual circuit) purchased. Co-location data may include customer data, revenue data, network traffic data, market segment data, market influence, and so on. The number or bandwidth of current interconnections, as well as previous trends for a customer, may be input variables. The length of time may also be an input variable. Publicly available financial information such as stock price, reported earnings, and profit margin may also be input variables.

In some examples, magnetic score engine 134 may output, for display to the co-location facility provider, the magnetic score. For instance, magnetic score engine 134 may output for display a set of customers along with each customer's magnetic score in a results user interface (UI). Each magnetic score for a customer indicates an importance of the customer to other customers of the co-location facility and indicates the likelihood that other customers will leave the facility if the customer leaves the facility. In some examples, a co-location facility provider may be able to modify the algorithms in magnetic score engine 134, thereby calibrating or redefining the concept of magnetic score.

Results UI may display the magnetic scores in numerical format (e.g., a value in the range 0-100), in letter grades (A through F), or any other suitable symbol for indicating a relative magnetic score for customers. In some examples, Results UI may display a message such as "there are four other customers following customer X" that explains the basis for a magnetic score.

Certain customers in a co-location facility, such as cloud computing firms and financial exchanges, may carry heightened importance, attracting other customers and increasing the provider's bargaining power with respect to the other customers. If a major customer discontinues its relationship with a provider, many other customers may follow. Similarly, if the major customer remains at the co-location facility, other customers may also remain at the co-location facility. As a result, it may be important to a co-location facility provider's viability to anticipate and prevent any loss of its most important customers. Magnetic score engine 134 may assist a co-location facility provider in determining the importance of a customer and assessing the potential impact if the customer leaves the co-location facility.

Figure 3:
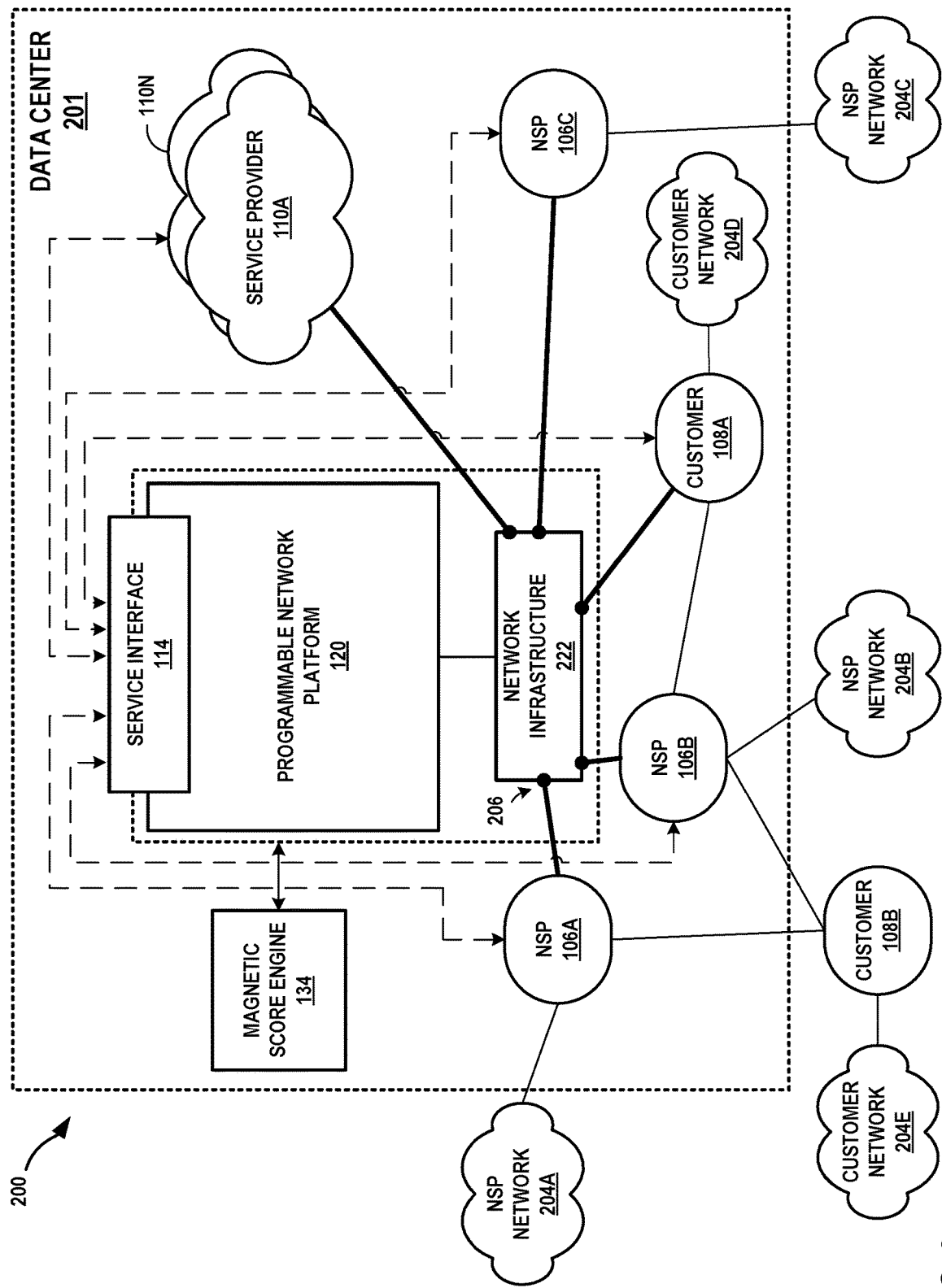
FIG. 3 is a block diagram illustrating a high-level view of a data center that provides an operating environment for a co-location facility, in accordance with techniques of the disclosure.

FIG. 3 is a block diagram illustrating a high-level view of a data center 201 that provides an operating environment for a co-location facility 200, and a magnetic score engine 134 that determines magnetic scores for customers, in accordance with techniques of the disclosure. Co-location facility 200 allows a corresponding one of customer networks 204D, 204E and NSP networks 204A-204C (collectively, "'private' or 'carrier' networks 204") of any NSPs 106A-106C or other customers including customers 108A, 108B to be directly cross-connected, via a layer 2 (L2) or layer 3 (L3) connection to any other customer network and/or to any of service providers 110A-110N, thereby allowing exchange of service traffic among the customer networks and SPs 110. Data center 201 may be entirely located within a centralized area, such as a warehouse or localized data center complex, and provide power, cabling, security, and other services to NSPs, customers, and service providers that locate their respective networks within the data center 201 (e.g., for co-location) and/or connect to the data center 201 by one or more external links. Customers 108 may represent enterprise customers of the co-location facility 200 provider, while NSPs 106 and service providers 110 may represent provider customers of the co-location facility 200 provider.

Network service providers 106 may each represent a network service provider that is associated with a transit network by which network subscribers of the NSP 106 may access services offered by SPs 110 via the co-location facility 200. In general, customers of SPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such services as are offered by the SPs 110 via the co-location facility 200.

As shown in FIG. 3, data center 201 may include magnetic score engine 134. Magnetic score engine 134 may be operably coupled to programmable network platform 120, such that magnetic score engine 134 may communicate with programmable network platform 120. In accordance with techniques of the disclosure, magnetic score engine 134 may determine magnetic strength scoring data for co-location facility customers, and output such scoring data to a co-location facility provider. Magnetic score engine 134 may further provide a co-location facility provider with an indication of the magnetic strength of a first customer indicating the first customer's pull-through strength with respect to other customers.

In some examples, magnetic score engine 134 may select a co-location facility customer. For example, customer 108A may be located in data center 201 and may be interconnected with other customers in data center 201. As such, magnetic score engine 134 may query telemetry data indicating interconnections established between customer 108A and other co-location facility customers at data center 201. Magnetic score engine 134 may query telemetry data for co-location facilities other than co-location facility 200 and data center 201. Magnetic score engine 134 may apply a magnetic score model to the telemetry data in order to generate a magnetic score for customer 108A. In one example, magnetic score engine 134 may generate a magnetic score based on data describing interconnections, such as the number, size, bandwidth, and network traffic, that customer 108A has established with other customers 108, NSPs 106, and SPs 110. In another example, magnetic score engine 134 may compare the number and strength of the interconnections of customer 108A to the average number and strength of interconnections for all customers.

In another example, magnetic score engine 134 may use data describing the number and strength (e.g., size/bandwidth and network traffic of interconnections) of the interconnections of customer 108A, along with one or more machine learning algorithms, to generate a magnetic score. Machine learning algorithms applied by magnetic score engine 134 may take many forms and may include various variable importance measuring methods like regression analysis, Gini importance, permutation importance, and other measurements for determining statistical significance. Regression analysis may provide an equation, algorithm, and/or coefficients for a multi-variable analysis that, when applied to data described herein, produces a magnetic score. Magnetic score engine 134 may periodically perform regression analysis or another tool using then-existing data to update the equation or algorithm for future use.

Figure 4:
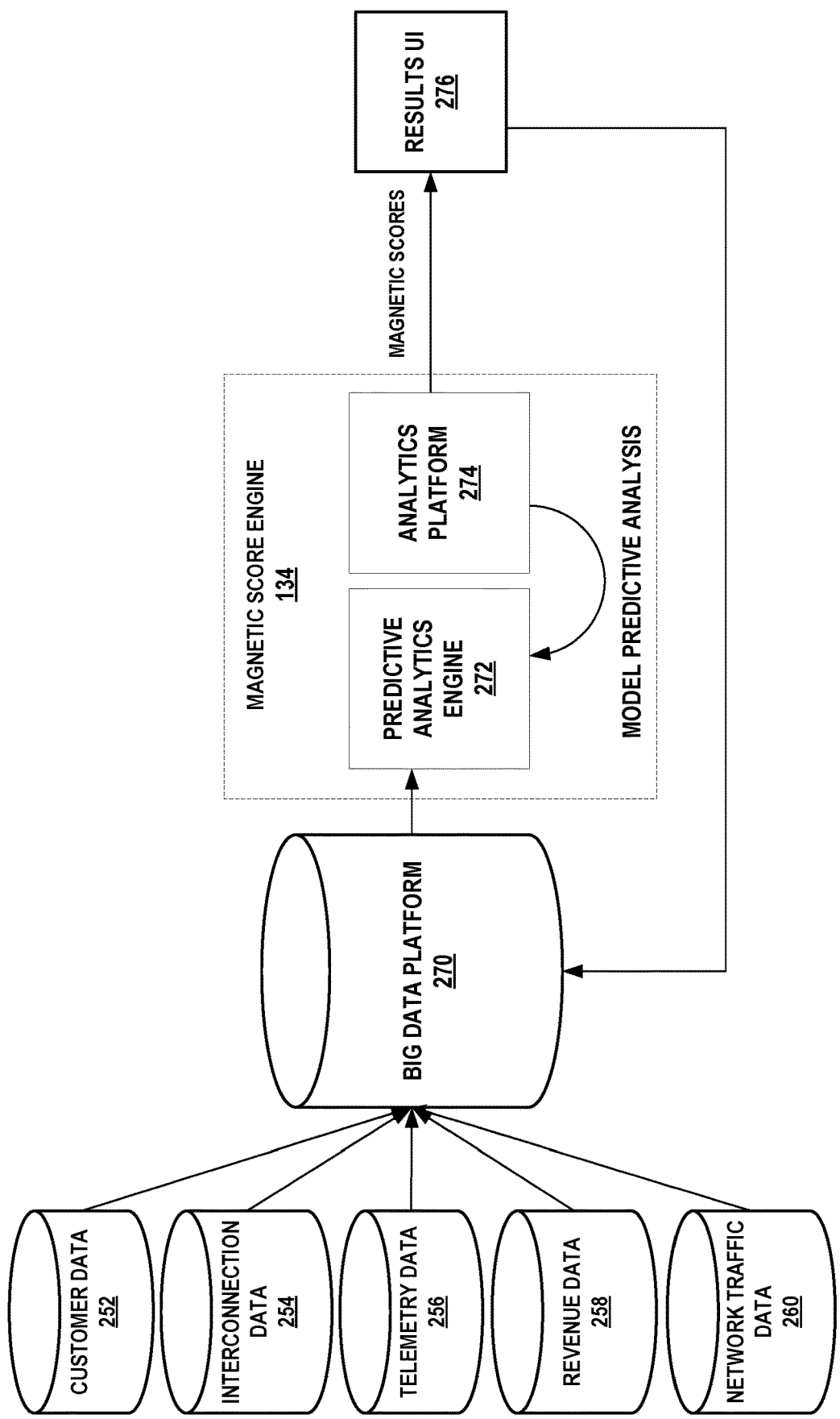
FIG. 4 is a conceptual diagram of logical components that may be used to generate the magnetic scores, in accordance with techniques of this disclosure.

FIG. 4 is a conceptual diagram of logical components that may be used to generate the magnetic scores, in accordance with techniques of this disclosure. Each of components 252-276 and 134 may be implemented in hardware, software, or a combination of hardware and software. As shown in FIG. 4, magnetic score engine 134 may include a predictive analytics engine 272, which generates scoring data in accordance with techniques of this disclosure, and an analytics platform 274, which calibrates the magnetic score model of analytics engine 272. To provide scoring data, magnetic score engine 134 may query big data platform 270 for information, such as but not limited to telemetry data, customer data, co-location facility user information, connection and interconnection information, co-location facility information, revenue data, network traffic data, as well as other types of data descriptive of customer and customer activity described herein. Using this information, magnetic score engine 134 may generate scoring data for co-location facility customers.

In the example of FIG. 4, big data platform 270 may provide analysis, capture, data curation, search, sharing, storage, transfer, visualization of data received from, but not limited to, customer data 252, interconnection data 254, telemetry data 256, revenue data 258, and network traffic data 260. In some examples, each of customer data 252, interconnection data 254, telemetry data 256, revenue data 258, network traffic data 260, and big data platform 270 may represent a Relational Database Management System (RDBMS), Object Database Management System (ODBMS), Online Analytical Processing (OLAP) system, Cassandra, data lake, or Big Data Computing system, to name only a few examples. Big data platform may receive data from one or more of customer data 252, interconnection data 254, telemetry data 256, revenue data 258, and network traffic data 260 on a periodic, user prompted, or real-time basis. In some examples, co-location data may comprise customer data 252, revenue data 258, and network traffic data 260 as sub-categories.

Customer data 252 may include information that identifies a co-location facility user, billing information for the co-location facility user, location information for the co-location facility user, co-location/interconnection preference information for the co-location facility user, to name only a few examples. Customer data 252 may indicate the date on which a first customer joined a co-location facility, thereby allowing magnetic score engine 134 to determine whether another customer is following the first customer.

Interconnection data 254 may include metrics about the quantity, type, and definition of network and resource configurations that are configured by programmable network platform 120. Interconnection data 254 may include analytics information from infrastructure data collectors based on raw metrics data for resources used in a particular service. In some examples, interconnection data 254 includes connection information that describes a connection that a co-location facility user has to a co-location facility network. In some examples, interconnection data 254 includes interconnection information that describes an interconnection between at least two customer networks at a co-location facility point or co-location facility.

In some examples, interconnection data may include data describing prior interconnections of a first co-location facility customer. Data describing prior interconnections may provide magnetic score engine 134 with context for data describing current interconnections. In this way, magnetic score engine 134 may use data describing prior interconnections may as an independent variable to generate a magnetic score.

Magnetic score engine 134 may determine an interconnection trend for a first co-location facility customer by using data indicating prior interconnections for the customer. Magnetic score engine 134 may compare the data indicating prior interconnections for the customer with telemetry data indicating interconnections established between a first customer and at least one additional customer. For example, if the number and size of a first co-location facility customer's interconnections have increased or decreased, magnetic score engine 134 may determine an interconnection trend that magnetic score engine 134 can incorporate into its multi-variable analysis.

Telemetry data 256 may include metrics describing the transmission of data in or through a co-location facility by a first co-location facility user. Telemetry data 256 may be similar to interconnection data 254 or network traffic data 260, but telemetry data 256 may indicate a current configuration of a co-location facility network for interconnecting customers. Telemetry data 256 may further include information about the number, intensity, and duration of interconnections at one or more co-location facilities. Telemetry data 256 may indicate the date and history of interconnections among customers at a co-location facility. Telemetry data 256 may indicate which customer initiated each interconnection, whether the customers are cross-connecting, and whether they have been peering on cloud exchange or internet exchange.

Revenue data 258 may include information about how much a customer pays to the co-location facility provider. Revenue data 258 may include information about how much other customers pay to the co-location facility provider, if those other customers are directly or indirectly dependent on the first customer. Using a discount rate, magnetic score engine 134 may estimate the value of monthly recurring revenue (MRR) to the co-location facility provider. Network traffic data 260 may include information describing the size and number of data transmissions corresponding to a first co-location facility customer. Network traffic 260 may indicate the amount of traffic or data across one or more interconnections at a co-location facility.

Big data platform 270 may include other categories of data that are not depicted in FIG. 4, such as market segment data and market influence data. Market segment data may indicate the distribution of market segment that is held by a first customer. If the first customer holds a large market share, the first customer's magnetic score may increase. Market influence data may indicate how much influence a second customer possesses. Magnetic score engine 134 may use these data sources to determine different magnetic scores for influence and importance of a customer. The influence of a customer may be defined within a single co-location facility, within a single metropolitan area, within a single country or region, or worldwide. The customer may have a different amount of influence at each geographic level.

The magnetic score may be a weighted composite score that is based on multiple sub-scores that may indicate a customer's co-location and interconnection footprint. The sub-scores may include an interconnection sub-score, a revenue sub-score, a churn impact sub-score, a growth impact sub-score, a geographical sub-score, a market segment sub-score, a market influence sub-score, a network traffic sub-score, and a spreading power sub-score. The interconnection sub-score may be based on the magnetic strength of interconnections of a first customer and its partners. The term partners may refer to other customers that are dependent on the first customer or that have formed an interconnection with the first customer. The revenue sub-score may be based on the revenue generated by a first customer and its partners. The churn impact sub-score may be based on the planned and/or predicted churn risk of a first customer and its partners. A revenue impact sub-score may combine details of the revenue sub-score and the churn impact sub-score. The growth impact sub-score may be based on the planned and/or predicted growth of the first customers and its partners. The geographical sub-score may be based on the geographical distribution of the co-location facilities of the first customer and its partners. The market segment sub-score may be based on the distribution of market segment of the partners of the first customer. The market influence sub-score may be based on the industry influence of the first customer and its partners. The network traffic sub-score may be based on the network traffic between various interconnections involving the first customers and its partners. The spreading power sub-score may be based on quantifying the spreading power (growth) of all customers in the interconnection framework.

As shown in FIG. 4, magnetic score engine 134 includes predictive analytics engine 272 and analytics platform 274. In accordance with techniques of this disclosure, predictive analytics engine 272 may select a co-location facility customer. Predictive analytics engine 272 may identify telemetry data 256 indicating interconnections established between a first co-location facility customer and other additional co-location facility customers. Predictive analytics engine 272 may generate scoring data for the co-location facility customers based at least in part on the telemetry data 256. Predictive analytics engine 272 may output the scoring data for display to a co-location facility provider.

In some examples, the magnetic scoring data is further based on at least one characteristic of a first co-location facility customer, such as one or more of customer data 252, interconnection data 254, telemetry data 256, revenue data 258, or network traffic data 260. The scoring data may be based on additional characteristics such as the duration that a customer has been at a particular facility or facilities, the quantity and quality of customer visits to facility or facilities and customer communications with the providers of those facilities, and the industry segment for a customer, such as cloud computing, network service provider, retailer, financial institution, or manufacturing, and so forth. Analytics platform 274 may use machine learning algorithms to modify the manner in which it generates scoring data.

In some examples, predictive analytics engine 272 may rank each co-location facility customer based on the scoring data. This may be represented in the output displayed to a co-location facility provider at results UI 276. As described above, the characteristics may include a customer name, a business type, a location of a co-location facility or facilities where the customer is located, an amount of space that the customer has leased, a price that the customer pays, a number of existing customer interconnections with other co-located customers, and so forth. The scoring data may also indicate the strength of any of the customer's interconnections with other customers.

In some examples, the predictive analytics engine 272 may score a co-location facility customer according to the scores for other co-location facility customers with similar characteristics, such as customer data 252, interconnection data 254, telemetry data 256, revenue data 258, and network traffic data 260, business type, and facility location. A customer profile for a customer may also include pricing information for services, the customer market segment(s), services offered or consumed, revenue, bandwidth consumed, and other customer data. Customer data 252 may store such customer profiles. Predictive analytics engine 272 may compare the profiles of customers with similar characteristics in order to generate a magnetic score.

In some examples, predictive analytics engine 272 may determine revenue impact scoring data based on possible revenue losses for a first customer, the magnetic score for the first customer, and for other customers that may follow the first customer. For example, for each interconnection customer, predictive analytics engine 272 may calculate a revenue loss estimation based on current price paid by the customer, the amount of spaced leased by the customer, and revenue derived from other customers who have interconnected with the customer. For instance, a first co-location facility customer may pay $100,000 per month at one or more co-location facilities. In this example, four other customers at the co-location facility each pay $100,000 per month and each has an interconnection to the first customer. The predictive analytics engine 272 may determine the revenue impact for the loss of the first customer as a function of the magnetic score for the first customer and the other four customers. A magnetic score indicative of significant pull-through may indicate the other four customers are certain to leave the facility if the first customer were to leave the facility. Accordingly, predictive analytics engine 272 may determine that the first customer's revenue impact score is equivalent to $500,000 per month, which is the sum total of all revenue derived from the first customer and the four connected customers. Predictive analytics engine 272 may determine a smaller revenue impact score depending on the intensity with which the other customers are following the first customer, which intensity is indicated by the magnetic score for the first customer. The dependencies of a customer may not necessarily leave a co-location facility if the customer departs. Thus, the revenue impact score for a customer may include only a percentage of the revenue that is attributable to the customer's dependencies. The percentage may be based on the weights of the dependencies on the customer.

The revenue impact score of a first customer may estimate the direct revenue loss and the indirect revenue loss. The direct revenue loss may indicate the rent paid by the first customer. The indirect revenue loss may indicate the rent paid by other customers that are dependent on the first customer. The indirect revenue loss may be adjusted by the likelihood that each of the other customers will leave when the first customer leaves, as indicated by the magnetic score. A revenue impact score may be based on telemetry data that indicates interconnections involving the first customer. The telemetry data may indicate which customers are dependent on the first customer.

Analytics platform 274 may request customer data from big data platform 270 for a first customer to determine that customer's magnetic score. Analytics platform 274 may identify a first co-location facility customer with a high magnetic score, as compared to the average customer magnetic score for the co-location facility or the average customer magnetic score for all of the co-location facilities owned or managed by the provider. Analytics platform 274 may determine that a first co-location facility customer has a higher magnetic score because of, for example, a quantity or quality of interconnections that the first customer has with other customers. In generating the magnetic score, the analytics platform may consider past data for the first customer or for other customers. Accordingly, analytics platform 274 may generate a list of co-location facility customers that have moderate or high magnetic scores, as compared to the average for the co-location facility or facilities. For instance, analytics platform 274 may provide the list of customers in a results user interface (UI) 276. Details of results UI 276 for magnetic score analysis are further described in FIG. 6. In some examples, analytics platform 274 may send one or more messages to the co-location facility provider, such as an email, text message, or other suitable communication.

As with magnetic scores, analytics platform 274 may generate a list of co-location facility customers that may be provided to the co-location facility provider. For instance, analytics platform 274 may provide a list of the customers with the highest magnetic scores. In some examples, analytics platform 274 may provide a list of the customers with the highest churn impact, which may represent the likelihood that a first customer will churn, multiplied by the loss of revenue in the event of churn. Details of results user interface 276 for magnetic score analysis are further described in FIG. 6. In some examples, analytics platform 274 may send one or more messages to the co-location facility provider, such as an email, text message, or other suitable communication.

In some examples, the co-location facility provider may interact with results user interface 276 to view and select customers and their magnetic scores for further action. For instance, the co-location facility provider may provide a user input that causes a message to be sent from the co-location facility provider to one or more of the co-location facility customers. The message may communicate a message from the provider, such as a survey to gauge the customer's satisfaction with the co-location facilities or a communication relating to price based on the magnetic scores presented by results user interface 276.

Figure 5:
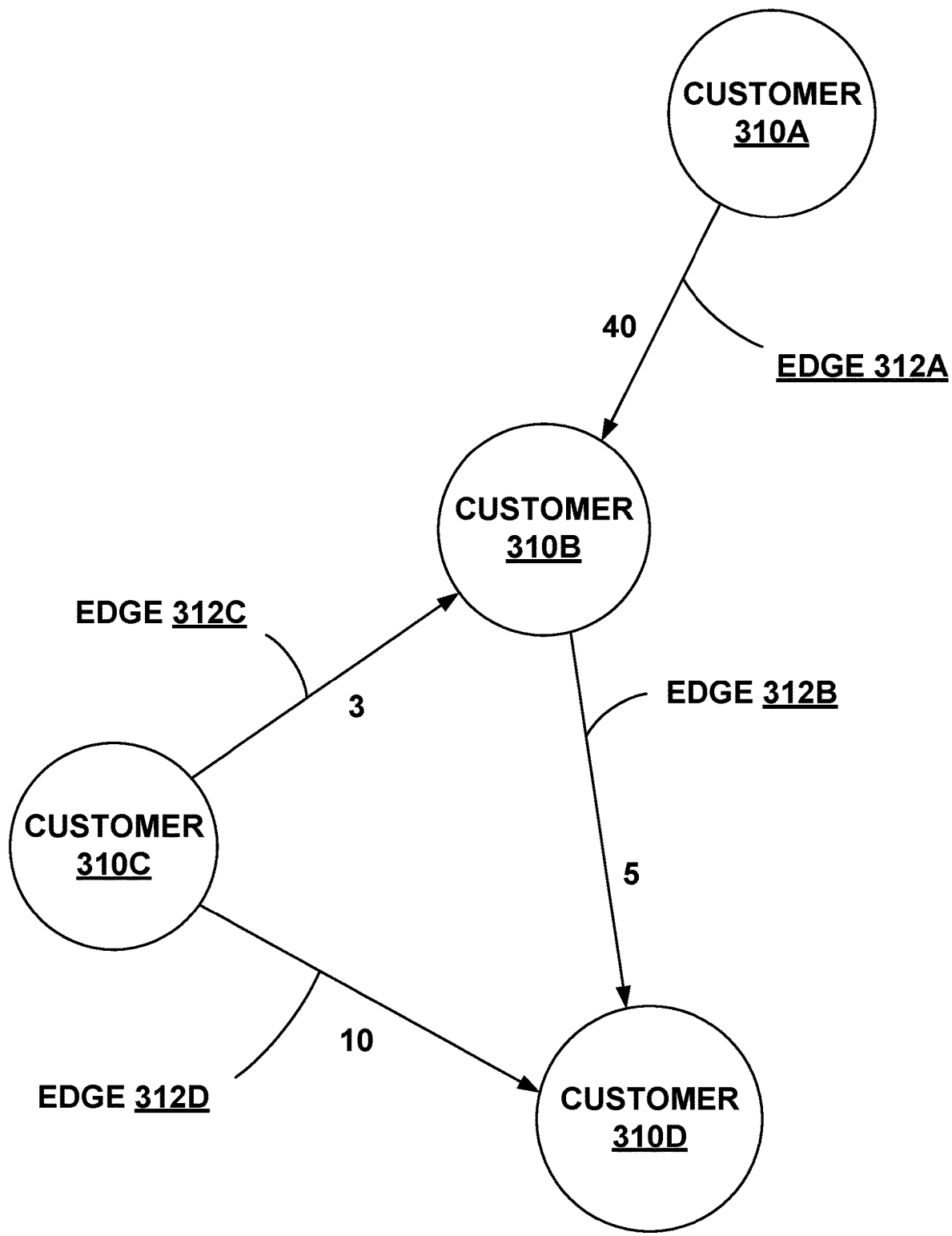
FIG. 5 is a block diagram illustrating the dependencies among four customers at a co-location facility.

FIG. 5 is a block diagram illustrating a dependency model among four customers 310A-310D at a co-location facility, according to techniques described in this disclosure. Each of customers 310 may be businesses or individuals that lease space and storage capacity from a co-location facility provider. The direction of each edge 312 from customer 310A to customer 310B indicates that customer 310A is dependent on customer 310B, i.e., is co-located at the facility at least in part due to the presence of customer 310B. That is, customer 310A may have joined (or is remaining at) the co-location facility because of customer 310B's presence there. Moreover, customer 310A may have established interconnections with customer 310B in order to communicate with and transfer data to/from customer 310B. The weight 40 for edge 312A from customer 310A to customer 310B may indicate a degree of dependency, e.g., the relative strength of customer 310A's dependence on customer 310B. The strength of customer 310A's dependence on customer 310B is consequently much higher than the other three dependencies illustrated in FIG. 5. For example, a large amount of service data flowing from customer 310B to customer 310A may correlate to a high weight for edge 312A.

Customers 310B and 310C are dependent on customer 310D, as depicted by the direction of edges 312B and 312D from customers 310B and 310C to customer 310D. Customer 310C is dependent on customer 310B, as indicated by edge 312C. Therefore, customer 310B's magnetic score may be increased by the direct dependencies of customers 310A and 310C, and customer 310D's magnetic score may be increased by the direct dependencies of customers 310B and 310C. Customer 310D also has second-degree interconnection dependencies from customers 310A and 310C.

The strength of each dependency is defined by the weight of each edge 312. For example, customer 310B has an interconnection dependency with a weight of 3 from customer 310C and an interconnection dependency with a weight of 40 from customer 310A. The sum of weights of the interconnection dependencies for customer 310B is thus 43. Similarly, customer 310C has an interconnection dependency with a weight of 10 with customer 310D, and customer 310B has an interconnection dependency with a weight of 5 with customer 310D.

The algorithms that determine the sub-scores as well as the composite score include customized versions of various graph analytics algorithms, customized weighted PageRank algorithm, and customized weighted Text Rank algorithm, in particular. In order to understand the algorithms and their customization to co-location facilities and interconnection facilities, it is important to understand graph analytics, such as the analytics applied to the relationships depicted in FIG. 5. Magnetic score engine 134 may use a customized algorithm that is an ensemble of a weighted PageRank algorithm, a weighted TextRank algorithm, and a Node Influence algorithm. Magnetic score engine 134 may use N-degree weighting whereby customer 310C's magnetic score may be weighted when generating a magnetic score for customer 310D. This weighting is customizable and allows for flexibility in the level of importance to be given to customer 310A when scoring customer 310D, allowing the magnetic score of other customers to influence the magnetic score of the first customer. N-degree weighting can give differentiated weights to each degree (i.e., 3rd, 4th, etc.) or the same weight to each degree of interconnection. The user can customize the individual weighting that is given at each degree of dependency, such as third-degree, fourth-degree, and up to Nth-degree. The customized algorithm also allows a flat weight across all N-degree nodes or customizable weighting for each degree.

Magnetic score engine 134 may use bi-directional weighted scoring. In the event that one or more interconnections represent a bidirectional dependency between customers, magnetic score engine 134 may assign a weight for each direction that is customizable and flexible. For nodes where interconnections are mutual, the customized algorithm supports weight setting for each direction. A customized implementation of magnetic score engine 134 may enable a user to alter the weight and importance of directionality of the interconnection graph.

Magnetic score engine 134 may further implement spreading power weighting to determine, at least in part, magnetic scores for customers. Spreading power weighting is a customized version of the Node influence algorithm that measures the spreading power of nodes, such as customers 310, in an interconnection graph. Centrality measures may be able to identify a network's most influential nodes, but centrality measures may not be accurate in quantifying the spreading power of a large number of nodes that are not influential. Instead, by considering the distribution of the force of infection generated by each node, spreading power weighting may better explain the spreading power of all network nodes. The resulting metric, called the expected force, accurately quantifies the node spreading power of every node in a complex interconnection graph. The magnetic score engine may use the spreading power algorithm to compute the spreading power sub-score.

According to the dependencies and strengths depicted in FIG. 5, magnetic score engine 134 may determine an example set of magnetic scores as 100.0 for customer 310D, 66.1 for customer 310B, 44.0 for customer 310A, and 40.9 for customer 310C. The high magnetic score of customer 310D may reflect the dependencies of customers 310B and 310C, and also the strong second-degree dependency of customer 310A through customer 310B.

Figure 6:
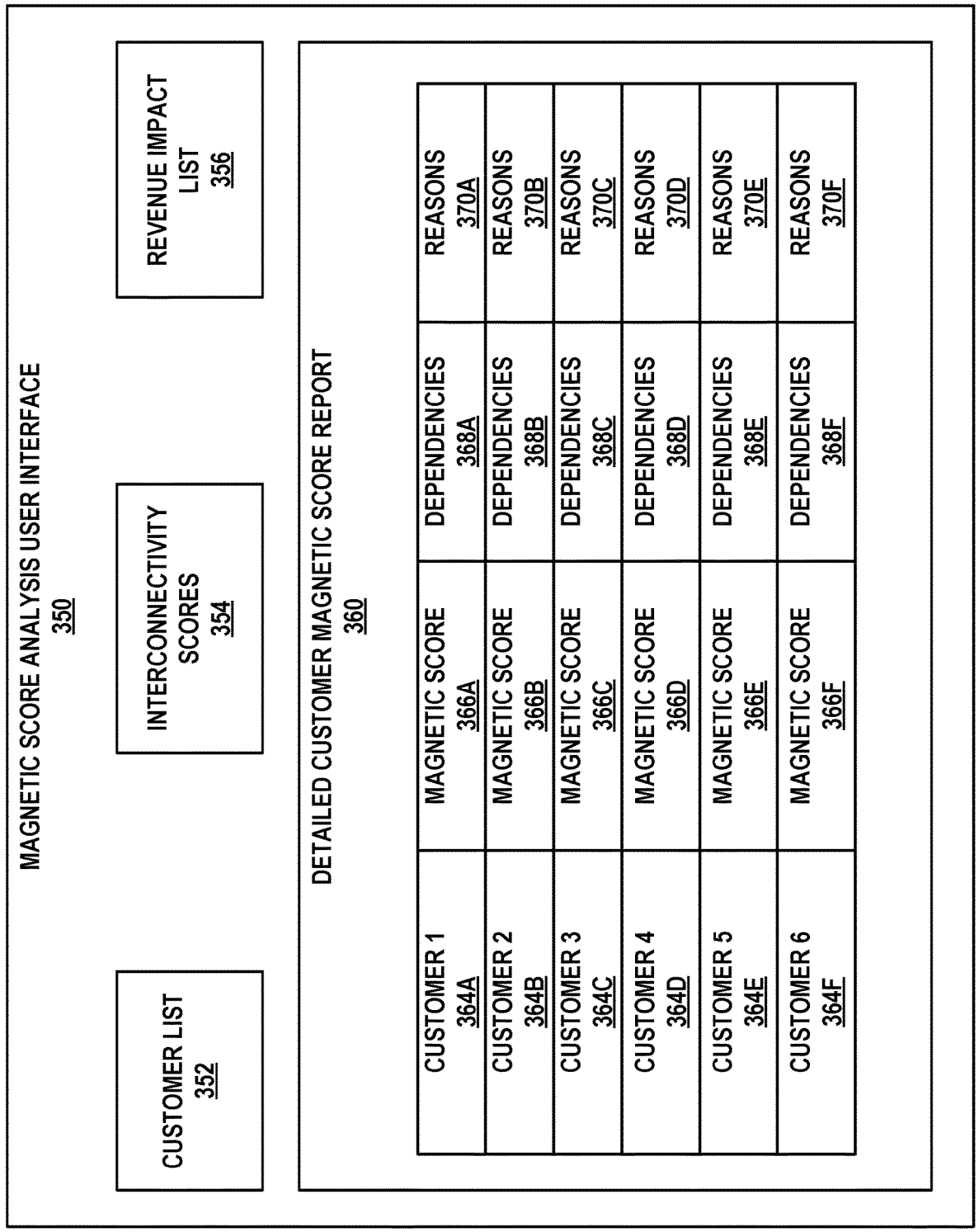
FIG. 6 is an example user interface that indicates one or more magnetic scores based on one or more data items describing each customer, in accordance with techniques of the disclosure.

FIG. 6 is an example user interface that indicates one or more magnetic scores based on one or more data items describing each customer, in accordance with techniques of the disclosure. In some examples, magnetic score analysis user interface (UI) 350 may be generated by magnetic score engine 134 as described in FIG. 2 and output to a display (e.g., a computer monitor or a tablet, smartphone, or PDA interface). Magnetic score analysis user interface 350 may be generated by magnetic score engine 134 for a co-location facility provider, such that the information included in magnetic score analysis user interface 350 contains the customers of the co-location facility provider.

Magnetic score analysis user interface 350 may include one or more user interface elements to output information or provide input, such as but not limited to: labels, input fields, drop-down menus, buttons, images, tab controls, and navigation controls to name only a few examples. Magnetic score analysis user interface 350 may include a customer list element 352. Customer list element 352 may display a list of all of the customers of a co-location facility provider at one or more co-location facilities. Customer list element 352 may also include several variables describing each customer, including name, industry, facility locations, amount of space rented, price, and length of time as a customer. Interconnectivity scores element 354 may include a total count of existing interconnections for a set of customers at one or more co-location facilities, as described in accordance with techniques of this disclosure. Magnetic score analysis user interface 350 may also include a revenue impact list element 356. Revenue impact list element 356 may include a set of customers organized by the amount of revenue that each customer may directly or indirectly generate for the co-location facility provider, as described in accordance with techniques of this disclosure.

In some examples, magnetic score analysis user interface 350 may include a detailed customer magnetic score report 360 that includes records for multiple different customers described by customer elements 364A-364F (collectively, "customer elements 364"). Although six customer user interface elements are illustrated for example purposes, any number of records for corresponding customers may be included in customer magnetic score report 360. Each of customer elements 364 may identify a specific co-location facility customer. As an example, customer element 364A may include a name, logo, or other identifier of a first co-location facility user.

As described above, each customer corresponding to one of customer elements 364 may be associated with a particular magnetic score. For example, the scoring data may indicate the impact of each customer on the other customers at one or more co-location facilities. In other examples, customer magnetic score report 360 may create a more detailed magnetic score determination for each customer. In some examples, magnetic score engine 134 can estimate a magnetic score based on the estimated revenue associated with each customer and other customers that are dependent on the first customer. The customer associated with customer element 364A may have four other customers that are dependent on the customer. If all four dependent customers are completely dependent on the first customer, the first customer's magnetic score may reflect the total monthly rent paid by the four dependent customers. The detailed customer magnetic score report 360 may include an estimation of the potential revenue loss associated with other customers that may be co-located with the customer associated with customer element 364A, in the event that the customer leaves the co-location facility. This potential revenue loss may be expressed as an impact score.

Magnetic score analysis user interface 350 may also include magnetic score user elements 366A-366F (collectively, "magnetic score elements 366") that may be associated with customer elements 364. Magnetic score elements 366 may be expressed in many forms, including but not limited to a numerical score of 0 to 100, or a letter grade from A to F. Magnetic score elements 366 may also include an indication of the dollar value that a first customer represents to the co-location provider. Magnetic score analysis user interface 350 may also include dependencies elements 368A-368F (collectively, "dependencies elements 368") that may be associated with customer elements 364. Dependencies elements 368 may be expressed in many forms, including but not limited to a list of the other customers that are dependent on a first co-location facility customer.

Magnetic score analysis user interface 350 may include reasons user elements 370A-370F ("collectively, "reasons elements 370"). Reasons elements 370 may explain significant factors in the magnetic score for respective customers associated with customer elements 364. For example, if a strong dependency by a customer has influenced the magnetic score of a first co-location facility customer, reasons element 370 may display the strong dependency. In addition, if there are strong second-degree dependencies that influenced a magnetic score, reasons element 370 may display the strong second-degree dependencies.

The information displayed in magnetic score analysis UI 350 may update automatically or may update when the user requests an update. An automatic update may occur on a regular schedule, such as once per month, or may occur when there is no data available. A user-initiated update may occur at the prompt of a user, or the update may occur whenever the user views the magnetic score analysis UI 350. A user may request an update of the detailed customer magnetic score report 360 through magnetic score analysis UI 350.

Figure 7:
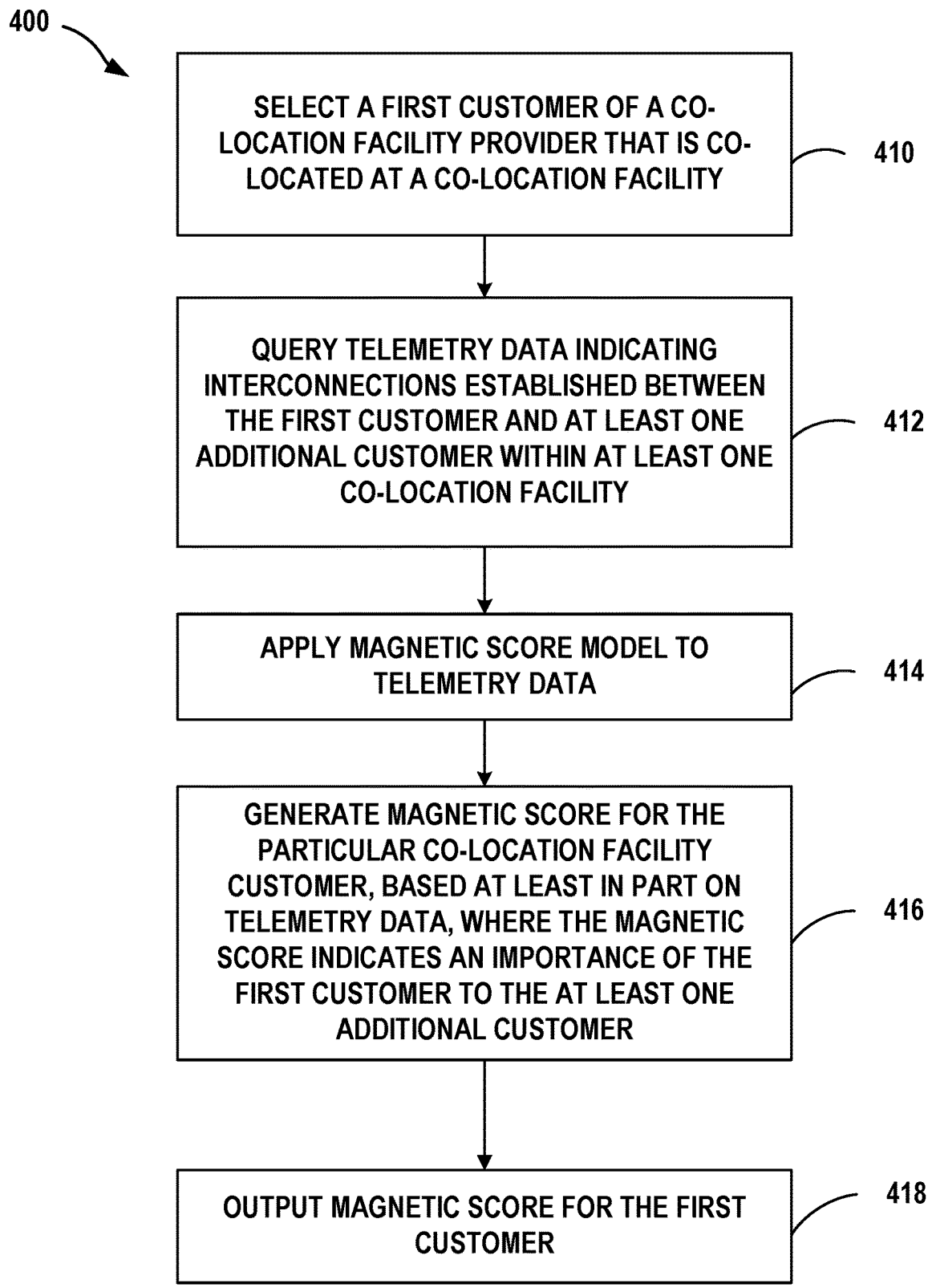
FIG. 7 is a flow diagram illustrating example operations of a computing device that determines magnetic scores based on one or more data items describing each customer, in accordance with techniques of the disclosure.

FIG. 7 is a flow diagram illustrating example operations of a computing device that determines magnetic scores based on one or more data items describing each customer, in accordance with techniques of the disclosure. For purposes of illustration, the example operations are described below within the context of magnetic score engine 134, as shown in FIG. 2. Techniques described herein may be performed in response to a request from a user of the computing device, which may include an employee of a co-location facility provider accessing a portal. Magnetic score engine 134 may select a first co-location facility customer that is colocated at a co-location facility (410).

To calculate a magnetic score, magnetic score engine 134 may query telemetry data indicating interconnections established between the first customer and at least one additional customer within at least one co-location facility (412). Magnetic score engine 134 may apply a magnetic score model to the telemetry data for the first customer (414). Magnetic score engine 134 may then generate a magnetic score for the first co-location facility customer, based at least in part on the telemetry data for the customer (416). Magnetic score engine 134 may output magnetic score for the first customer (418).

In some examples, magnetic score engine 134 may query co-location data, telemetry data, or other sets of data for a first co-location facility customer. Magnetic score engine 134 may apply a magnetic score model to the data. Magnetic score engine 134 may use machine learning algorithms to determine the importance of various input variables. Machine learning algorithms applied by magnetic score engine 134 may include various variable importance measuring techniques such as PageRank, Weighted TextRank, regression analysis, Gini importance, permutation importance, and other measurements for statistical significance. Magnetic score engine 134 may use graph analytics. Magnetic score engine 134 may use any algorithm, or combination of algorithms, to perform graph analytics. Example graph analytics algorithms may include PageRank and other algorithms that measure the influence of a node on other nodes in a network. The magnetic score model may be based on regression analysis using one or more independent variables, which may comprise interconnection data, telemetry data, and co-location data such as customer data, revenue data, or network traffic data. Magnetic score engine 134 may select one or more independent variables, such as the number of interconnections for a customer or the industry segments of the dependent customers. Magnetic score engine 134 may determine or adjust the weight or influence associated with the particular independent variable based on previous data of customers that joined or left the co-location facility. In this example, the magnetic score may be a dependent variable, and data on past customer arrivals and departures may be used to develop the magnetic score model.

Magnetic score engine 134 may generate scoring data for the co-location facility customer based at least in part on the data, which may include interconnection data, telemetry data, and co-location data, such as customer data, revenue data, or network traffic data. Magnetic score engine 134 may output the scoring data for display to the co-location facility provider on a display device. In some examples, the scoring data may include a revenue impact score that indicates the revenue that is attributable to the first customer, either directly or indirectly through its dependents.

Magnetic score engine 134 may group or rank each of the customers based on magnetic score. As described above, the scoring data for a first customer may include a revenue impact score that is representative of the amount of monthly recurring revenue attributable to the first customer, the impact on revenue if the customer churns, or the number and/or quality of interconnections of the first customer. For example, predictive analytics engine 272 may estimate revenue loss based on the rent paid by the customer and by its dependencies.

In some examples, magnetic score engine 134 may generate a new magnetic score for a first co-location facility customer once per month. In some examples, magnetic score engine 134 may generate a new magnetic score more or less frequently than once per month. If magnetic score engine 134 generates a new magnetic score more frequently than once per month, the data may not change much or may not change at all, resulting in little or no change in the magnetic score. If magnetic score engine 134 generates a new magnetic score less frequently than once per six months, then magnetic score engine 134 may not quickly respond to a change in the data 252-260 that results in a change in the magnetic score. Therefore, a co-location facility provider may balance a desire for up-to-date magnetic scores with the reality that data 252-260 may not change substantially over a short time period.

Magnetic score engine 134 may offer benefits to a co-location provider. These benefits include product pricing, churn impact to revenue analysis, customization, and flexibility. With respect to product pricing, a co-location facility provider may determine what price to offer a customer based on the magnetic score. In some examples, the co-location provider may offer more discounts to customers with higher magnetic scores because of their magnetic power in order to retain those customers and their dependents and to pull in more customers.

A co-location provider may use a revenue impact score to analyze the churn impact for a first customer. The revenue impact score is the potential revenue loss in the event that the first customer leaves the co-location facility. The revenue impact score may include direct and indirect revenue loss that is attributable to the first customer. A first customer with a higher magnetic score may have more dependents and therefore a higher revenue impact.

The magnetic score is also customizable and flexible, allowing a co-location facility provider to personalize the analysis of each customer. A co-location facility provider can review and weight individual sub-scores in various ways for personalized analysis of any given customer. For example, a co-location facility provider may increase the weight or importance of certain sub-scores, such as the growth impact sub-score and the market influence sub-score, in order to concentrate on one segment of the customers at a co-location facility.

Figure 8:
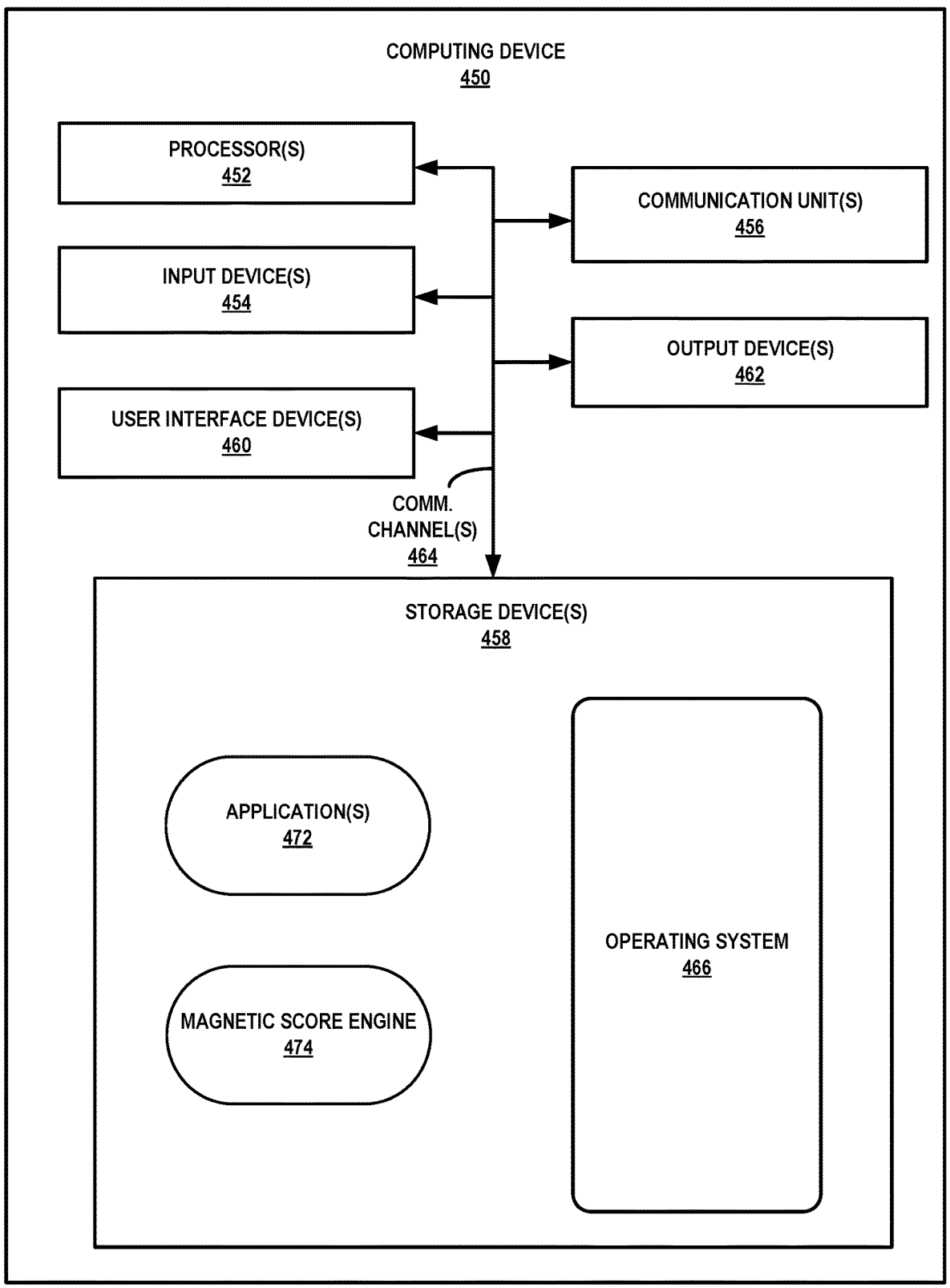
FIG. 8 is a block diagram illustrating further details of one example of a computing device that operates in accordance with one or more techniques of the present disclosure.

FIG. 8 is a block diagram illustrating further details of one example of a computing device that operates in accordance with one or more techniques of the present disclosure. FIG. 8 may illustrate a particular example of a server or other computing device 450 that includes one or more processor(s) 452 for executing magnetic score engine 474, or any other system, application, or module described herein. Magnetic score engine may represent an example of magnetic score engine 134 or other magnetic score engine for generating magnetic scores described herein. Other examples of computing device 450 may be used in other instances. Although shown in FIG. 8 as a stand-alone computing device 450 for purposes of example, a computing device may be any component or system that includes one or more processors or other suitable computing environment for executing software instructions and, for example, need not necessarily include one or more elements shown in FIG. 8 (e.g., communication units 456; and in some examples components such as storage device(s) 458 may not be co-located or in the same chassis as other components).

As shown in the specific example of FIG. 8, computing device 450 includes one or more processors 452, one or more input devices 454, one or more communication units 456, one or more output devices 462, one or more storage devices 458, and user interface (UI) device 460, and communication unit 456. Computing device 450, in one example, further includes one or more applications 472, magnetic score engine 474, and operating system 466 that are executable by computing device 450. Each of components 452, 454, 456, 458, 460, and 462 are coupled (physically, communicatively, and/or operatively) for inter-component communications. In some examples, communication channels 464 may include a system bus, a network connection, an inter-process communication data structure, or any other method for communicating data. As one example, components 452, 454, 456, 458, 460, and 462 may be coupled by one or more communication channels 464.

Processors 452, in one example, are configured to implement functionality and/or process instructions for execution within computing device 450. For example, processors 452 may be capable of processing instructions stored in storage device 458. Examples of processors 452 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 458 may be configured to store information within computing device 450 during operation. Storage device 458, in some examples, is described as a computer-readable storage medium. In some examples, storage device 458 is a temporary memory, meaning that a primary purpose of storage device 458 is not long-term storage. Storage device 458, in some examples, is described as a volatile memory, meaning that storage device 458 does not maintain stored contents when the computer is turned off. Examples of volatile memories include random access memories (RAM), dynamic random access memories (DRAM), static random access memories (SRAM), and other forms of volatile memories known in the art. In some examples, storage device 458 is used to store program instructions for execution by processors 452. Storage device 458, in one example, is used by software or applications running on computing device 450 to temporarily store information during program execution.

Storage devices 458, in some examples, also include one or more computer-readable storage media. Storage devices 458 may be configured to store larger amounts of information than volatile memory. Storage devices 458 may further be configured for long-term storage of information. In some examples, storage devices 458 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 450, in some examples, also includes one or more communication units 456. Computing device 450, in one example, utilizes communication units 456 to communicate with external devices via one or more networks, such as one or more wired/wireless/mobile networks. Communication units 456 may include a network interface card, such as an Ethernet card, an optical transceiver, a radio frequency transceiver, or any other type of device that can send and receive information. In some examples, computing device 450 uses communication unit 456 to communicate with an external device.

Computing device 450, in one example, also includes one or more user interface devices 460. User interface devices 460, in some examples, are configured to receive input from a user through tactile, audio, or video feedback. Examples of user interface devices(s) 460 include a presence-sensitive display, a mouse, a keyboard, a voice responsive system, video camera, microphone or any other type of device for detecting a command from a user. In some examples, a presence-sensitive display includes a touch-sensitive screen.

One or more output devices 462 may also be included in computing device 450. Output device 462, in some examples, is configured to provide output to a user using tactile, audio, or video stimuli. Output device 462, in one example, includes a presence-sensitive display, a sound card, a video graphics adapter card, or any other type of device for converting a signal into an appropriate form understandable to humans or machines. Additional examples of output device 462 include a speaker, a cathode ray tube (CRT) monitor, a liquid crystal display (LCD), or any other type of device that can generate intelligible output to a user.

Computing device 450 may include operating system 466. Operating system 466, in some examples, controls the operation of components of computing device 450. For example, operating system 466, in one example, facilitates the communication of one or more applications 472 and magnetic score engine 474 with processors 452, communication unit 456, storage device 458, input device 454, user interface devices 460, and output device 462.

Application 472 and magnetic score engine 474 may also include program instructions and/or data that are executable by computing device 450. Computing device 450 may execute magnetic score engine 474 to query data such as telemetry data and revenue data. Computing device 450 may execute magnetic score engine 474 to generate a magnetic score based on the telemetry data and/or revenue data. Computing device 450 may also execute magnetic score engine 474 to perform one or more of the operations and actions described in the present disclosure.

In some examples, magnetic score engine 474 may include instructions that cause computing device 450 to generate one or more sub-scores. Magnetic score engine 474 may include instructions that cause computing device 450 to use the sub-scores to generate a magnetic score. Magnetic score engine 474 may also include instructions that cause computing device 450 to output the sub-scores and magnetic score to magnetic score analysis user interface 350. Computing device 450 may output magnetic score analysis user interface 350 for display at user interface device 460 or output device 462.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the disclosure have been described. Any combination of the described systems, operations, or functions is contemplated. These and other examples are within the scope of the following claims.

What is claimed is:

1. A method comprising:
   querying, by a magnetic score engine executing at a computing device, first telemetry data indicating one or more interconnections established between a network of a first co-location facility customer and respective networks of at least one additional co-location facility customer within at least one co-location facility operated by a co-location facility provider, wherein the one or more interconnections enable packet-based communications between the network of the first co-location facility customer and the respective networks of the at least one additional co-location facility customer, and wherein the first telemetry data indicates, for the first co-location facility customer, multi-factor data for one or more of a number of interconnections, network traffic, and revenue by the first co-location facility customer;
   generating, by the magnetic score engine and based at least in part on the first telemetry data, a magnetic score for the first co-location facility customer by applying, by the magnetic score engine to the multi-factor data, a magnetic score model that specifies a first set of respective weights for factors of the multi-factor data, the magnetic score indicating an importance and a strength of attraction of the first co-location facility customer to the least one additional co-location facility customer being co-located at the at least one co-location facility; and
   outputting, by the magnetic score engine and for display at a display device, the magnetic score for the first co-location facility customer.

2. The method of claim 1, further comprising determining, by the magnetic score engine, a second set of respective weights for the at least one additional co-location facility customer, the second set of weights indicating respective degrees of dependency of the at least one additional co-location facility customer on the first co-location facility customer,
   wherein generating the magnetic score comprises generating, by the magnetic score engine based at least in part on the second set of weights, the magnetic score.

3. The method of claim 2, wherein determining the second set of respective weights comprises applying, by the magnetic score engine, at least one of a weighted PageRank algorithm and a weighted TextRank algorithm to the first telemetry data to determine the second set of weights.

4. The method of claim 1, wherein generating the magnetic score comprises:
  generating, by the magnetic score engine and based at least in part on the first telemetry data, two or more sub-scores for the first co-location facility customer, each of the two or more sub-scores indicating an importance and a strength of attraction of the first co-location facility customer to the least one additional co-location facility customer with respect to a different category from a plurality of categories;
  determining, by the magnetic score engine, a second set of respective weights for the two or more sub-scores; and
  applying, by the magnetic score engine, the second set of weights to each of the two or more sub-scores to generate the magnetic score.

5. The method of claim 1, further comprising querying, by the magnetic score engine, second telemetry data indicating one or more interconnections established between the respective networks of the at least one additional co-location facility customer and a network of a second co-location facility customer within the at least one co-location facility,
  wherein generating the magnetic score for the first co-location facility customer comprises generating, by the magnetic score engine and based at least in part on the second telemetry data, the magnetic score for the first co-location facility customer.

6. The method of claim 1, further comprising querying, by the magnetic score engine, network traffic data indicating an amount of network traffic being transmitted via the one or more interconnections established between the network of the first co-location facility customer and the respective networks of the at least one additional co-location facility customer,
  wherein generating the magnetic score for the first co-location facility customer comprises generating, by the magnetic score engine and based at least in part on the network traffic data, the magnetic score for the first co-location facility customer.

7. The method of claim 1, further comprising:
  querying, by the magnetic score engine, first customer data indicating a date the first co-location facility customer began co-locating at the co-location facility; and
  querying, by the magnetic score engine, second customer data indicating a date the at least one additional co-location facility customer began co-locating at the co-location facility,
  wherein generating the magnetic score for the first co-location facility customer comprises generating, by the magnetic score engine and based at least in part on the first customer data and the second customer data, a magnetic score for the first co-location facility customer.

8. The method of claim 1, further comprising querying, by the magnetic score engine, market segment data indicating a distribution of market segment of the first co-location facility customer,
  wherein generating the magnetic score for the first co-location facility customer comprises generating, by the magnetic score engine and based at least in part on the market segment data, the magnetic score for the first co-location facility customer.

9. The method of claim 1, further comprising querying, by the magnetic score engine, market influence data indicating an industry influence of the first co-location facility customer,
  wherein generating the magnetic score for the first co-location facility customer comprises generating, by the magnetic score engine and based at least in part on the market influence data, the magnetic score for the first co-location facility customer.

10. The method of claim 1, further comprising:
  querying, by the magnetic score engine, direct revenue data indicating an amount of revenue received by the co-location facility provider from the first co-location facility customer;
  querying, by the magnetic score engine, indirect revenue data indicating an amount of revenue received by the co-location facility provider from the at least one additional co-location facility customer;
  generating, by the magnetic score engine and based at least in part on the direct revenue data and the indirect revenue data, a revenue impact score for the first co-location facility customer; and
  outputting, by the magnetic score engine and for display at the display device, the revenue impact score for the first co-location facility customer.

11. A computing device comprising:
  one or more processors operably coupled to a memory; and
  a magnetic score engine configured for execution by the one or more processors to:
    query first telemetry data indicating one or more interconnections established between a network of a first co-location facility customer and respective networks of at least one additional co-location facility customer within at least one co-location facility operated by a co-location facility provider, wherein the one or more interconnections enable packet-based communications between the network of the first co-location facility customer and the respective networks of the at least one additional co-location facility customer, and wherein the first telemetry data indicates, for the first co-location facility customer, multi-factor data for one or more of a number of interconnections, network traffic, and revenue by the first co-location facility customer;
    generate, based at least in part on the first telemetry data, a magnetic score for the first co-location facility customer by applying, to the multi-factor data, a magnetic score model that specifies a first set of respective weights for factors of the multi-factor data, the magnetic score indicating an importance and a strength of attraction of the first co-location facility customer to the least one additional co-location facility customer being co-located at the at least one co-location facility; and
    output, for display at a display device, the magnetic score for the first co-location facility customer.

12. The computing device of claim 11, wherein the magnetic score engine is further configured to:
  query second telemetry data indicating one or more interconnections established between the respective networks of the at least one additional co-location facility customer and a network of a second co-location facility customer within the at least one co-location facility; and
  generate, based at least in part on the second telemetry data, the magnetic score for the first co-location facility customer.

13. The computing device of claim 11, wherein the magnetic score engine is further configured to:

query network traffic data indicating an amount of network traffic being transmitted via the one or more interconnections established between the network of the first co-location facility customer and the respective networks of the at least one additional co-location facility customer; and generate, based at least in part on the network traffic data, the magnetic score for the first co-location facility customer.

14. The computing device of claim 11, wherein the magnetic score engine is further configured to:
query first customer data indicating a date the first co-location facility customer began co-locating at the co-location facility;
query second customer data indicating a date when the at least one additional co-location facility customer began co-locating at the co-location facility; and
generate, based at least in part on the first customer data and the second customer data, a magnetic score for the first co-location facility customer.

15. The computing device of claim 11, wherein the magnetic score engine is further configured to:
query direct revenue data indicating an amount of revenue received by the co-location facility provider from the first co-location facility customer;
query indirect revenue data indicating an amount of revenue received by the co-location facility provider from the at least one additional co-location facility customer;
generate, based at least in part on the direct revenue data and the indirect revenue data, a revenue impact score for the first co-location facility customer; and
output, for display at the display device, the revenue impact score for the first co-location facility customer.

16. A non-transitory computer-readable storage medium encoded with instructions that, when executed, cause at least one processor of a computing device to:
query first telemetry data indicating one or more interconnections established between a network of a first co-location facility customer and respective networks of at least one additional co-location facility customer within at least one co-location facility operated by a co-location facility provider, wherein the one or more interconnections enable packet-based communications between the network of the first co-location facility customer and the respective networks of the at least one additional co-location facility customer, and wherein the first telemetry data indicates, for the first co-location facility customer, multi-factor data for one or more of a number of interconnections, network traffic, and revenue by the first co-location facility customer;
generate, based at least in part on the first telemetry data, a magnetic score for the first co-location facility customer by applying, to the multi-factor data, a magnetic score model that specifies a first set of respective weights for factors of the multi-factor data, the magnetic score indicating an importance and a strength of attraction of the first co-location facility customer to the least one additional co-location facility customer being co-located at the at least one co-location facility; and
output, for display at a display device, the magnetic score for the first co-location facility customer.

17. The non-transitory computer-readable storage medium of claim 16, further comprising instructions that, when executed, cause the at least one processor to:
query second telemetry data indicating one or more interconnections established between the respective networks of the at least one additional co-location facility customer and a network of a second co-location facility customer within the at least one co-location facility; and
generate, based at least in part on the second telemetry data, the magnetic score for the first co-location facility customer.

18. The non-transitory computer-readable storage medium of claim 16, further comprising instructions that, when executed, cause the at least one processor to:
query network traffic data indicating an amount of network traffic being transmitted via the one or more interconnections established between the network of the first co-location facility customer and the respective networks of the at least one additional co-location facility customer; and
generate, based at least in part on the network traffic data, the magnetic score for the first co-location facility customer.

19. The non-transitory computer-readable storage medium of claim 16, further comprising instructions that, when executed, cause the at least one processor to:
query direct revenue data indicating an amount of revenue received by the co-location facility provider from the first co-location facility customer;
query indirect revenue data indicating an amount of revenue received by the co-location facility provider from the at least one additional co-location facility customer;
generate, based at least in part on the direct revenue data and the indirect revenue data, a revenue impact score for the first co-location facility customer; and
output, for display at the display device, the revenue impact score for the first co-location facility customer.

* * * * *